United States Patent
Komatsu et al.

(10) Patent No.: US 10,538,217 B2
(45) Date of Patent: Jan. 21, 2020

(54) COMPLETELY FOLDED BODY OF AIRBAG

(71) Applicant: TOYODA GOSEI CO., LTD., Kiyosu-shi, Aichi-ken (JP)

(72) Inventors: Takanori Komatsu, Kiyosu (JP); Hideo Higashi, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 0 days.

(21) Appl. No.: 15/349,208

(22) Filed: Nov. 11, 2016

(65) Prior Publication Data
US 2017/0136980 A1 May 18, 2017

(30) Foreign Application Priority Data
Nov. 13, 2015 (JP) ................. 2015-223407

(51) Int. Cl.
*B60R 21/237* (2006.01)
*B60R 21/217* (2011.01)
(Continued)

(52) U.S. Cl.
CPC .......... *B60R 21/237* (2013.01); *B60R 21/203* (2013.01); *B60R 21/215* (2013.01);
(Continued)

(58) Field of Classification Search
CPC ... B60R 21/201; B60R 21/203; B60R 21/217; B60R 21/231; B60R 21/237;
(Continued)

(56) References Cited

U.S. PATENT DOCUMENTS 5,330,223 A * 7/1994 Hiramitsu ......... B60R 21/21656
280/728.2
5,368,327 A * 11/1994 Shiraki ................ B60R 21/217
280/728.2
(Continued)

FOREIGN PATENT DOCUMENTS

JP 2001-063504 A 3/2001
JP 2007-261565 A 10/2007

OTHER PUBLICATIONS

Office Action dated Sep. 25, 2018 issued in corresponding JP patent application No. 2015-223407 (and English translation).

*Primary Examiner* — Laura Freedman
(74) *Attorney, Agent, or Firm* — Posz Law Group, PLC

(57) ABSTRACT

A completely folded body of an airbag includes: a folded body and a retainer, which is assembled to the folded body, including: an annular bottom wall portion; a plurality of fixing units; and a reinforcing rib, wherein: the folded body of the airbag is configured in such a folded shape that the airbag is folded to be gathered to an upper side of the retainer; the folded body is arranged with a bottom wall cover portion and a bottom wall separated portion which extends from the bottom wall cover portion; and the bottom wall separated portion includes a stepped surface having a vertical surface bent upward from the bottom wall cover portion, and a horizontal surface which is disposed above the bottom wall cover portion from an upper end of the vertical surface and extends toward an outer circumferential edge of the bottom wall separated portion.

5 Claims, 21 Drawing Sheets

(51) Int. Cl.
*B60R 21/203* (2006.01)
*B60R 21/231* (2011.01)
*B60R 21/215* (2011.01)

(52) U.S. Cl.
CPC .......... *B60R 21/217* (2013.01); *B60R 21/231* (2013.01); *B60R 21/2037* (2013.01); *B60R 21/2176* (2013.01)

(58) Field of Classification Search
CPC .......... B60R 21/215; B60R 2021/2176; B60R 2021/2037; B60R 21/2037; B60R 21/2176
See application file for complete search history.

(56) References Cited

U.S. PATENT DOCUMENTS

| | | | | |
|---|---|---|---|---|
| 5,425,552 | A * | 6/1995 | Linder | B60R 21/203 280/743.1 |
| 5,931,491 | A * | 8/1999 | Bosgeiter | B60R 21/217 280/728.2 |
| 6,007,088 | A * | 12/1999 | Yamamoto | B60R 21/217 280/728.3 |
| 6,533,318 | B2 * | 3/2003 | Yamaji | B60R 21/205 280/732 |
| 7,150,470 | B2 * | 12/2006 | Okada | B60R 21/205 280/743.1 |
| 7,481,449 | B2 * | 1/2009 | Ishiguro | B60R 21/237 280/731 |
| 7,530,597 | B2 * | 5/2009 | Bito | B60R 21/233 280/742 |
| 2013/0017942 | A1 | 1/2013 | Ko | |
| 2017/0136662 | A1 * | 5/2017 | Komatsu | B29C 43/14 |
| 2017/0136979 | A1 * | 5/2017 | Komatsu | B60R 21/2037 |
| 2017/0210331 | A1 * | 7/2017 | Komatsu | B60R 21/237 |

\* cited by examiner

V-V SECTIONAL VIEW

COMPLETELY FOLDED BODY OF AIRBAG

CROSS-REFERENCE TO RELATED APPLICATION(S)

This application is based upon and claims the benefit of priority from Japanese Patent Application No. 2015-223407, filed on Nov. 13, 2015, the entire contents of which are incorporated herein by reference.

BACKGROUND

1. Field of the Invention

The present invention relates to a completely folded body of an airbag which includes a folded body of an airbag having an inflow opening through which an inflation gas is allowed to flow, and a retainer which is assembled to the folded body in order to attach the folded body to a storage portion, and relates to a completely folded body of an airbag which can be smoothly attached to an airbag holder, a case, and the like as the storage portion such as a driver seat airbag device or a passenger seat airbag device.

2. Description of the Related Art

In the related art, such a kind of the completely folded body of the airbag includes the folded body of the airbag having the inflow opening through which the inflation gas is allowed to flow, and the retainer which is assembled to the folded body in order to attach the folded body to the storage portion (for example, see JP-A-2007-261565). The retainer includes an annular bottom wall portion which has a communication opening opened corresponding to the inflow opening in the center, a plurality of bolts as a fixing unit which protrude downward from the bottom wall portion, which is centered on the communication opening, around the communication opening and are fixed to the storage portion, and a reinforcing rib which is arranged to stand from the outer circumferential edge of the bottom wall portion. The retainer is arranged in the airbag in a state where the bolt protrudes outside the airbag, and the bottom wall portion abuts on the circumferential edge of the inflow opening on the inner circumferential surface side of the airbag. The folded body of the airbag is configured in such a compact folded shape that the airbag is folded to be gathered to the upper side of the retainer in a state where the circumferential edge of the inflow opening is disposed on the lower surface side of the bottom wall portion of the retainer.

However, in the conventional completely folded body, for the compact configuration, the outer circumferential edge of the flattened airbag is folded to be pressed to the upper surface side of the retainer such that the airbag is gathered to the upper side of the retainer in a state where the circumferential edge of the inflow opening of the airbag is disposed on the lower surface side of the bottom wall portion of the retainer.

For this reason, there is a risk that not only the circumferential edge of the inflow opening of the airbag but also a portion of the airbag near the circumferential edge is pressed to be disposed on the lower side of the bottom wall portion of the retainer. In this case, when the airbag is attached to the storage portion by using the fixing unit such as the bolt of the retainer, the portion of the airbag near the circumferential edge is jammed between the retainer and the storage portion unexpectedly. When the inflation gas flows into the airbag in that state, the jammed portion is not inflated so that it cannot be secured that the airbag becomes in an appropriate completely-inflated shape.

SUMMARY

The invention is made to solve the above-described problems, and an object thereof is to provide a completely folded body of an airbag in which an unexpected jam of the airbag between a retainer and a storage portion can be prevented.

According to an aspect of the invention, there is provided a completely folded body of an airbag including: a folded body of the airbag having an inflow opening through which an inflation gas is allowed to flow; and a retainer which is assembled to the folded body in order to attach the folded body to a storage portion, the retainer including: an annular bottom wall portion having a communication opening, which is open in correspondence to the inflow opening, in a center; a plurality of fixing units which protrude downward from the annular bottom wall portion, which is centered on the communication opening, around the communication opening, and are fixed to the storage portion; and a reinforcing rib which is arranged to stand from an outer circumferential edge of the annular bottom wall portion, wherein: the annular bottom wall portion is disposed in a circumferential edge of the inflow opening on an inner circumferential surface side of the airbag, and is arranged in the airbag in a state where the fixing unit protrudes outside the airbag; the folded body of the airbag is configured in such a folded shape that the airbag is folded to be gathered to an upper side of the retainer in a state where the circumferential edge of the inflow opening is disposed on a lower surface of the annular bottom wall portion of the retainer; the folded body is arranged, on the bottom surface side, with a bottom wall cover portion which is disposed on the lower surface of the annular bottom wall portion of the retainer and a bottom wall separated portion which extends from the bottom wall cover portion and is disposed around the annular bottom wall portion of the retainer; and a portion, which is connected from the bottom wall cover portion, of the bottom wall separated portion includes a stepped surface having a vertical surface bent upward from the bottom wall cover portion, and a horizontal surface which is disposed above the bottom wall cover portion from an upper end of the vertical surface and extends toward an outer circumferential edge of the bottom wall separated portion.

In the completely folded body according to the invention, the stepped surface arranged in the portion, which is connected from a bottom wall cover portion, of the bottom wall separated portion of the bottom surface of the folded body. The stepped surface includes the vertical surface bent upward from the bottom wall cover portion, and the horizontal surface which is disposed above the bottom wall cover portion from the upper end of the vertical surface and extends toward the outer circumferential edge of the bottom wall separated portion. That is, when the horizontal surface of the stepped surface is arranged in an upper position where a jam hardly occurs, the horizontal surface is separated, by a distance difference offset upward from the bottom wall cover portion, upward from the storage portion where the fixing unit is fixed. Accordingly it can be prevented that the stepped surface of the bottom wall separated portion, or a portion adjacent thereto is jammed between the storage portion and the retainer.

Therefore, in the completely folded body of the airbag according to the invention, an unexpected jam of the airbag between the retainer and the storage portion can be prevented.

In the completely folded body according to the invention, the stepped surface is desirably arranged in the entire area of the bottom wall separated portion of the folded body.

With such a configuration, the stepped surface is disposed in the entire circumference around the bottom wall cover portion, that is, the entire portion around the retainer. Therefore, compared with the case of being partially disposed, it can be more reliably prevented that the bottom wall separated portion or a portion adjacent thereto is jammed between the storage portion and the retainer.

In the completely folded body of the invention, the horizontal surface of the stepped surface is desirably disposed above the bottom wall portion of the retainer, and is more desirably disposed to be positioned at a height equal to or higher than the upper end surface of the reinforcing rib of the retainer.

That is, when the horizontal surface of the stepped surface is disposed above the bottom wall portion of the retainer, or is disposed, more higher, to be positioned at a height equal to or higher than the upper end surface of the reinforcing rib of the retainer, it can be further prevented in proportion to increase of the height that the bottom wall separated portion or the portion adjacent thereto is jammed between the storage portion and the retainer.

Specifically, when the horizontal surface of the stepped surface is disposed to be positioned at the height equal to or higher than the upper end surface of the reinforcing rib of the retainer, and the side wall portion of the airbag cover for covering the completely folded body is fitted into the outer circumferential side of the completely folded body, only the portion, which is connected with the bottom wall cover portion, of the vertical surface of the stepped surface in the bottom wall separated portion of the folded body is disposed on the outer circumferential side of the reinforcing rib of the retainer. Therefore, it can be prevented the jam of the airbag (the bottom wall separated portion or the portion adjacent thereto) between the reinforcing rib and the side wall portion of the airbag cover, for example, the deformation of the completely-inflated shape.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
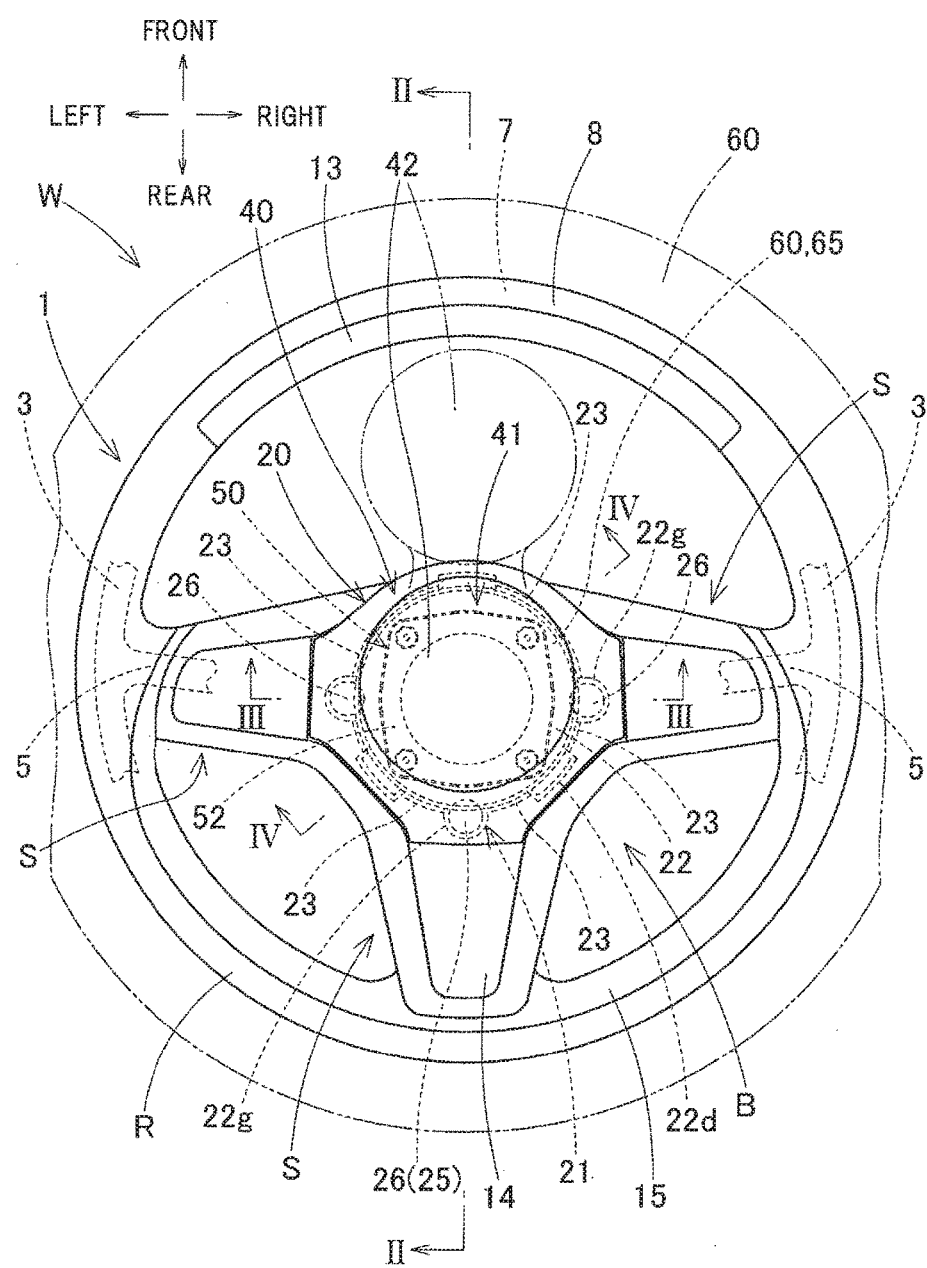
FIG. 1 is a schematic plan view illustrating a steering wheel on which an airbag device storing a completely folded body of an embodiment of the invention is mounted.
Figure 2:
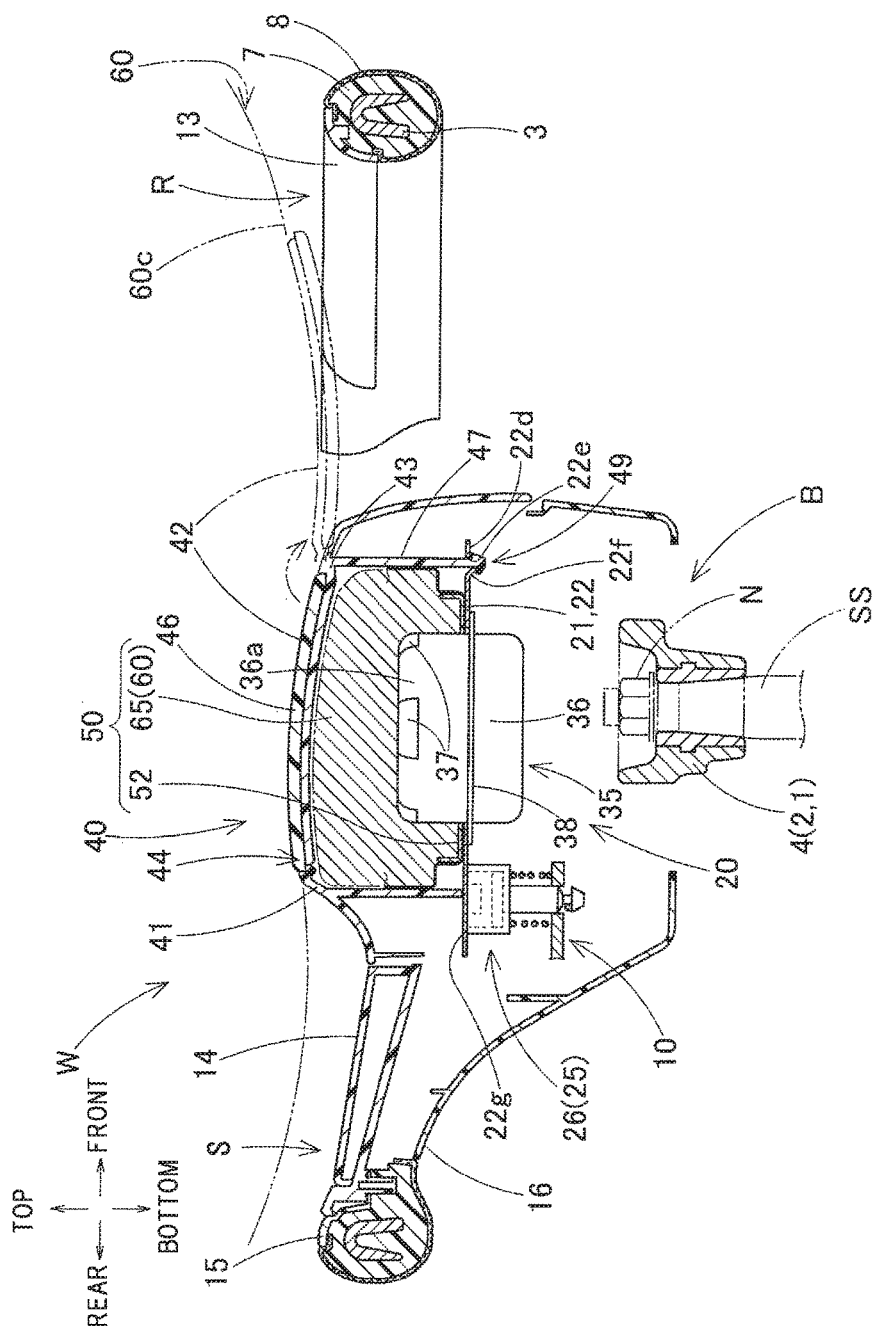
FIG. 2 is a schematic longitudinal sectional view illustrating the steering wheel storing the completely folded body of the embodiment, and corresponds to II-II portion of FIG. 1.

Hereinafter, an embodiment of the invention will be described with reference to drawings. As illustrated in FIGS. 1 to 4, a completely folded body 50 of an airbag 60 of the embodiment is used to an airbag device 20 mounted on a boss portion B of a steering wheel V. As illustrated in FIGS. 1 and 2, the steering wheel W includes a steering wheel body 1 including a ring portion R which is gripped at the time of steering, the boss portion B disposed in the center of the ring portion R, and a spoke portion S connecting the ring portion R and the boss portion B, and the airbag device 20 arranged on the upper portion of the boss portion B.

In the present specification, a vertical direction, a right-left direction, and a front-rear direction of the airbag device 20, the completely folded body 50, the steering wheel W, and the like are based on when a vehicle is steered straight ahead in a state where the steering wheel W is connected to a steering shaft SS (see FIG. 2) of the vehicle by fixing with a nut N. The vertical direction corresponds to a vertical direction along the axial direction of the steering shaft SS.

The right-left direction corresponds to a right-left direction of the vehicle which is the axis orthogonal direction of the steering shaft SS. The front-rear direction corresponds to a front-rear direction of the vehicle which is the axis orthogonal direction of the steering shaft SS (see FIGS. 1 and 2).

The steering wheel body 1 includes a cored bar 2 arranged so as to connect the ring portion R, the boss portion B, and the spoke portion S to each other, and a coating layer 7 which is made of urethane and the like, and covers the ring portion R and the cored bar 2 of the spoke portion S near the ring portion R. A leather 8 is wound on the surface of the coating layer 7. Decorative garnishes 13 and 15 are arranged on the inner circumferential side of the front portion and the rear portion of the ring portion R.

The cored bar 2 includes a ring cored bar 3 disposed in the ring portion R, a boss cored bar 4 disposed to the boss portion B so as to be connected with the steering shaft SS, and a spoke cored bar 5 disposed to the right and left spoke portions S so as to connect the ring cored bar 3 and the boss cored bar 4. In the case of the embodiment, the spoke cored bars 5 are arranged only in the two right and left spoke portions S on the front side. A bezel 14 enclosing the periphery of an airbag cover (to be illustrated later, pad) 40 is arranged the spoke portion S on the rear side.

A fixing portion 10 which fixes each assembly pin 29 of a horn switch mechanism 25 (to be described later) of the airbag device 20 is arranged in the circumferential edge of the boss cored bar 4 of the cored bar 2 (see FIGS. 2 and 3). The fixing portion 10 includes a locking hole 11 which is penetrated in a tapered shape of narrowing downward, and a locking pin 12 which is disposed on the lower surface of the boss cored bar 4 and locks a locking head 31 of the assembly pin 29. The locking pin 12 is formed of a bendable spring to be restorable and along the lower surface of the boss cored bar 4.

Figure 4:
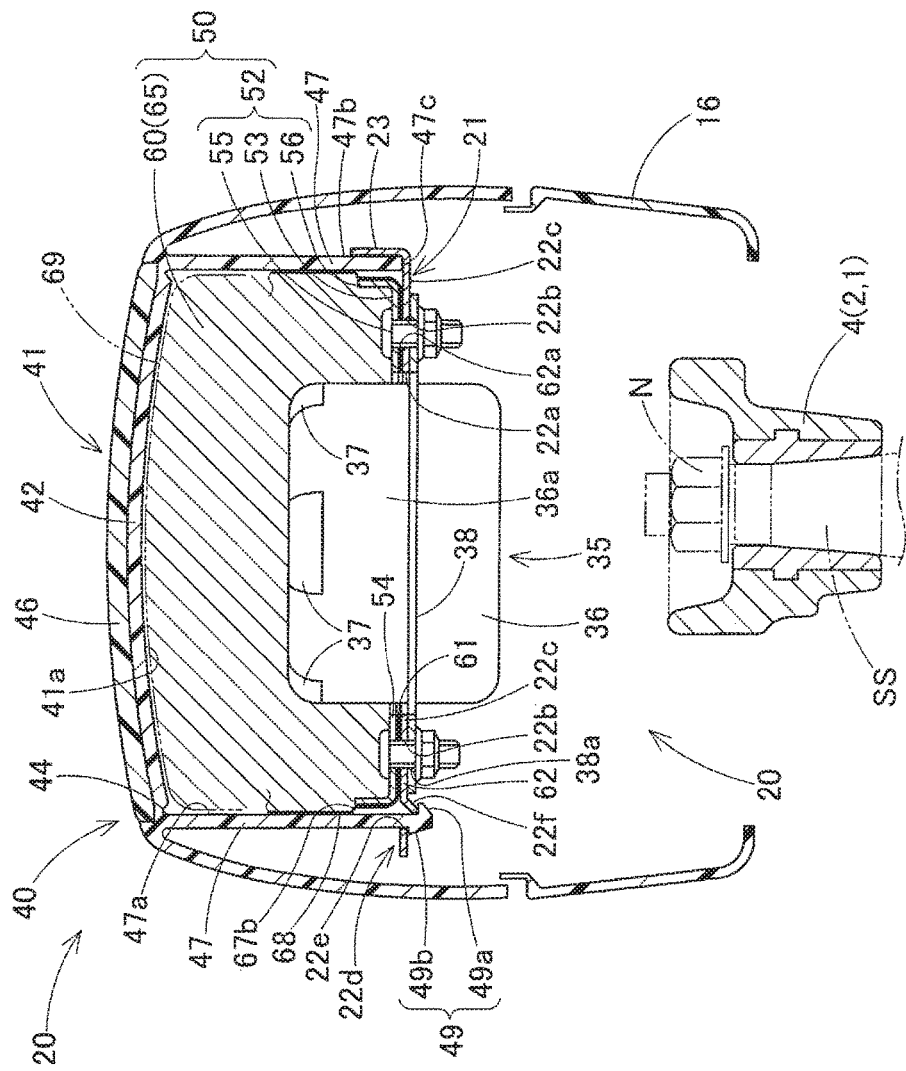
FIG. 4 is a schematic longitudinal sectional view illustrating the steering wheel storing the completely folded body of the embodiment, and corresponds to IV-IV portion of FIG. 1.
Figure 5A:
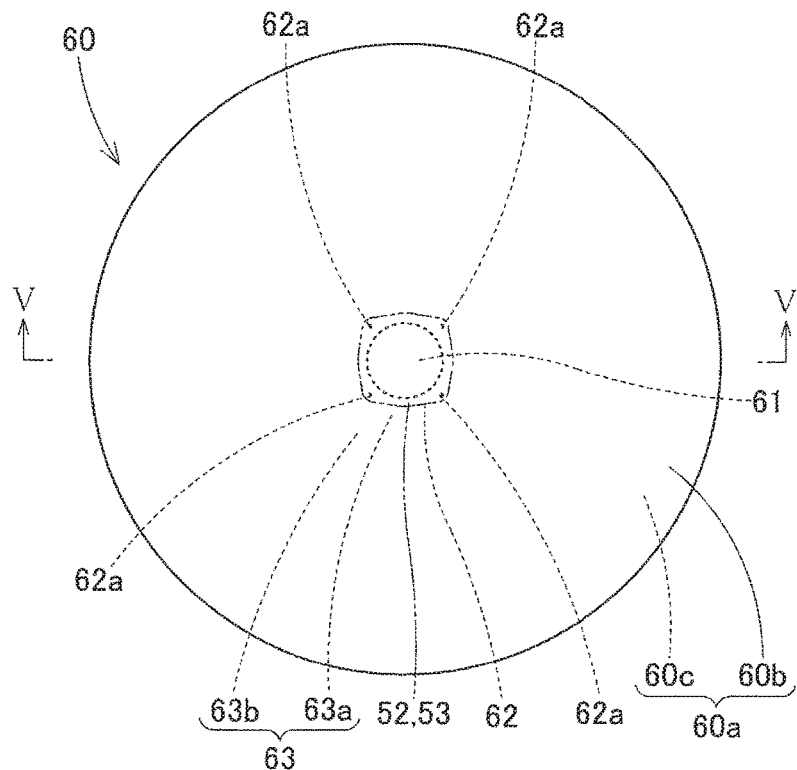
FIGS. 5A and 5B are a schematic plan view and a schematic sectional view illustrating a state where an airbag of the completely folded body of the embodiment is completely inflated as a single unit.
Figure 5B:
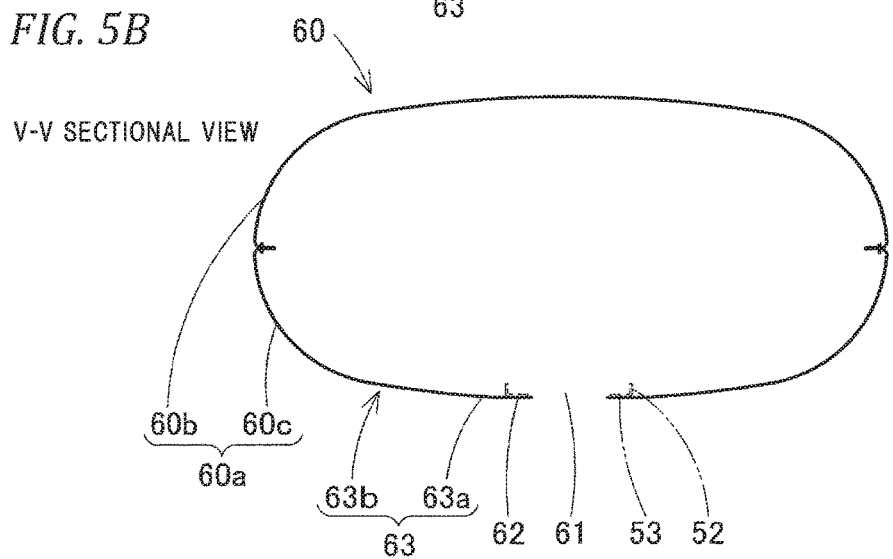

The steering wheel body 1 is configured such that a lower cover 16 is arranged on the lower surface of the boss portion B (see FIGS. 2 and 4).

As illustrated in FIGS. 1 to 4, the airbag device 20 includes the completely folded body 50 of the airbag 60, an inflator 35 which supplies an inflation gas to the airbag 60, the airbag cover (pad) 40 which is made of synthetic resin, and is disposed on the upper surface of the boss portion B to cover the completely folded body 50, and an airbag holder 21 which is made of a metal plate and functions as a storage portion of a folded body 65 of the airbag 60. The airbag holder 21 is a portion for attaching and fixing the completely folded body 50 (folded body 65), and also a portion which holds the inflator 35 and the airbag cover 40.

In the case of the embodiment, the completely folded body 50 includes the folded body 65 formed by folding the airbag 60, and a retainer 52, which is stored in the folded body 65, for attaching the completely folded body (airbag 60) 50 to the airbag holder 21. The completely folded body 50 has an approximately columnar shape.

As illustrated in two-dot chain lines of FIGS. 1 and 2 and FIGS. 5A and 5B, the airbag 60 has a completely-inflated shape which is close to a spherical shape, is thick, and is an approximately disc shape, and includes an inflow opening 61 which is circularly open downward to allow the inflation gas to flow therein (see FIGS. 3 to 5B). Four through holes 62a through which bolts 55 as a fixing unit of the retainer 52 penetrate are formed in a circumferential edge 62 of the inflow opening 61. A circumferential wall 60a of the airbag 60 is configured by suturing the outer circumferential edges of a driver-side panel 60b and a vehicle-side panel 60c which have a circular outer shape. The inflow opening 61 is arranged in the center of a vehicle body-side panel 60c. The circumferential edge 62 of the inflow opening 61 is pressed by the retainer 52, and forms an attachment portion for attaching the airbag 60 to the airbag holder 21. The attachment portion 62 is an approximately quadrangular annular portion having a lower surface abutting on a lower surface 53c of a bottom wall portion 53 (to be described later) of the retainer 52. The lower surface serves as a bottom wall cover portion 66a (to be described later) of the folded body 65 formed by folding the airbag 60.

The attachment portion 62 and a portion 63 adjacent thereto are arranged with a reinforced fabric (not illustrated) for improving strength, and are configured in a sheet shape of a single plate with the vehicle-side panel 60c.

As illustrated in FIGS. 1 to 6, and 9, the retainer 52 is formed of a metal plate including a quadrangular annular bottom wall portion 53 having a communication opening 54, which is open in correspondence to the inflow opening 61, in the center, and a reinforcing rib 56 arranged to stand from the entire circumference of the outer circumferential edge of the bottom wall portion 53. The reinforcing rib 56 is arranged so as to improve a bending rigidity of the bottom wall portion 53. The communication opening 54 is a circular opening of the same shape as the inflow opening 61. The retainer 52 protrudes downward from the bottom wall portion 53 around the communication opening 54 with being centered on the communication opening 54, and includes the bolts 55 as a plurality of fixing units which are fixed to the airbag holder 21 as a storage portion of the completely folded body (airbag 60) 50. Each bolt 55 projects downward from the vicinity of each of four corner portions 53a of the quadrangular annular bottom wall portion 53. The retainer 52 is arranged in the circumferential edge (attachment portion) 62 of the inflow opening 61 in the airbag 60. Each bolt 55 penetrates through the through hole 62a of the airbag 60, a through hole 22b (to be described later) of the airbag holder 21, and a through hole 38a of a flange portion 38 (to be described later) of the inflator 35 in order. The completely folded body 50 and the inflator 35 are attached to the airbag holder 21 by tightening the nut 58 to the bolt 55.

Figure 13:
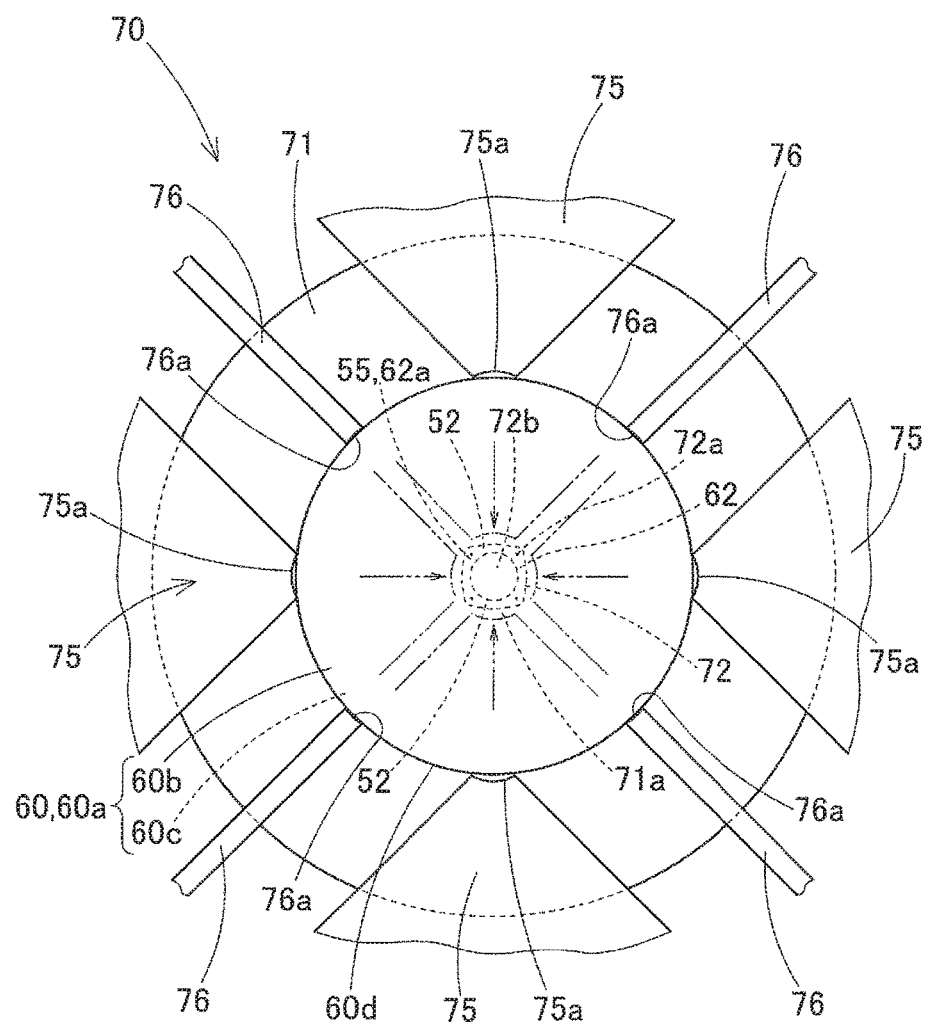
FIG. 13 is a schematic plan view illustrating an airbag folding machine which folds the airbag of the embodiment.
Figure 14:
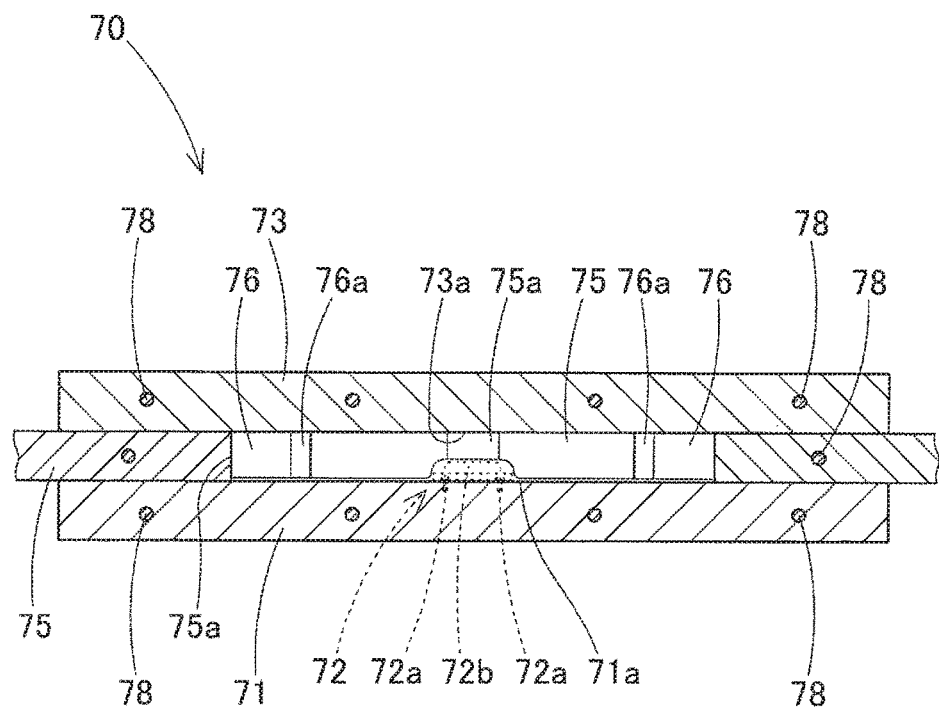
FIG. 14 is a schematic sectional view illustrating the airbag folding machine which folds the airbag of the embodiment.
Figure 15:
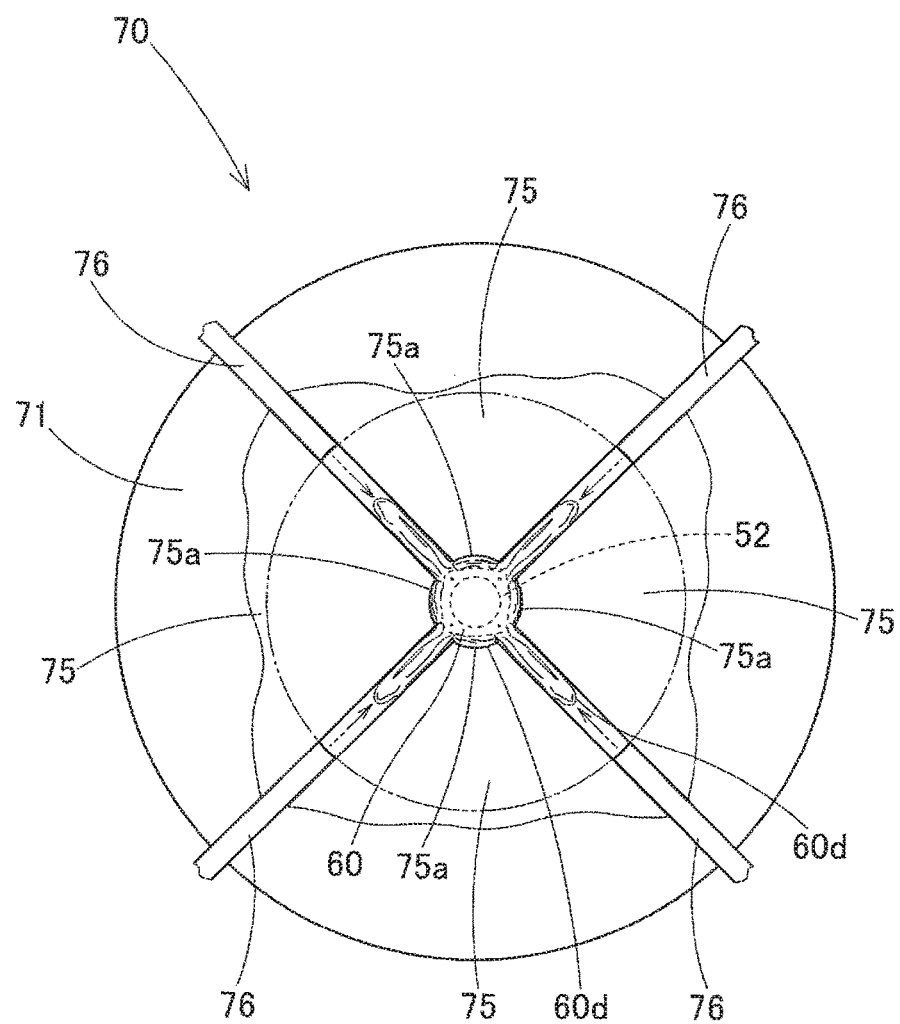
FIG. 15 is a diagram illustrating a folding process for folding the airbag of the embodiment.
Figure 16:
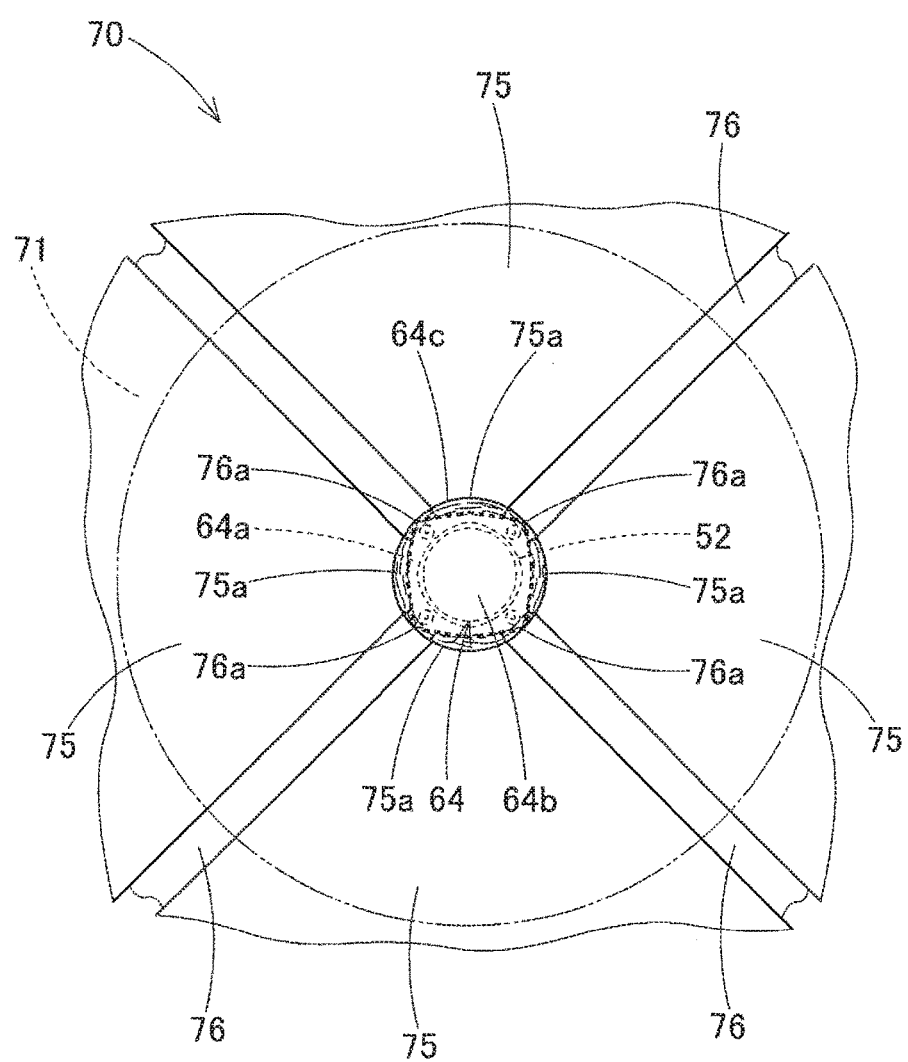
FIG. 16 is a diagram illustrating a folding process for folding the airbag of the embodiment, and illustrates a process subsequent to the process of FIG. 15.

First, as illustrated in FIG. 13, in the manufacturing method of the completely folded body 50, each bolt 55 protrudes from the through hole 62a, and the retainer 52 is arranged to the attachment portion 62 in the airbag 60. Then, the airbag 60 is flattened with the driver-side panel 60b overlapped on the vehicle-side panel 60c, and is set in an airbag folding machine 70. Then, as illustrated in FIGS. 15 and 16, the outer circumferential edge 60d of the airbag 60 is gathered to the upper side of the retainer 52, and the folded body 65 formed by folding the airbag 60, specifically, a pre-folded body 64 is formed on the upper side of the bottom wall portion 53 of the retainer 52. As illustrated in FIGS. 17 to 20, a stepped surface 67 is provided by using airbag molding machines 80 and 90 (to be described later), and when a compression working to maintain the folded shape is performed, it is possible to manufacture an approximately columnar completely folded body 50. The folded body 65 of the manufactured completely folded body 50 has a shape retention property to support the ceiling wall portion 41 of the airbag cover 40. Specifically, the folded body 65 has a lower rigidity than the airbag holder 21 and the retainer 52 which are made of a metal plate. However, the folded body 65 has the shape retention property with a higher rigidity than the airbag cover 40, and has such a rigidity that folding collapse does not occur and recess almost does not occurs to retain an approximately columnar outer shape although the folded body is inclined obliquely, is inverted vertically, or is pressed partially. Of course, the folded body 65 has a shape retention property within a range for allowing deployment and inflation of the airbag 60 at the time of inflow of the inflation gas.

As illustrated in FIGS. 6 to 9, the bottom wall cover portion 66a disposed on the lower surface 53c of the bottom wall portion 53 of the retainer 52, and a bottom wall separated portion 66b which extends from the bottom wall cover portion 66a and is disposed around the bottom wall portion 53 of the retainer 52 are arranged on the bottom surface 66 of the folded body 65 of the completely folded body 50. A portion, which is connected from the bottom wall cover portion 66a, of the bottom wall separated portion 66b includes the stepped surface 67 including a vertical surface 67a bent upward from the bottom wall cover portion 66a, and a horizontal surface 67b which is disposed on the upper side of the bottom wall cover portion 66a from the upper end 67at of the vertical surface 67a and extends toward the outer circumferential edge 66c of the bottom wall separated portion 66b. The horizontal surface 67b is configured in parallel with the bottom wall portion 53 and the bottom wall cover portion 66a.

A portion, which forms the bottom wall cover portion 66a, of the airbag 60 is the attachment portion 62 which is the circumferential edge of the inflow opening 61 in the vehicle-side panel 60c of the airbag 60 (see FIGS. 5A to 7, and 9). The attachment portion 62 has a single sheet shape without a wrinkle or a crease, and is arranged in close contact with the lower surface 53c of the bottom wall portion 53 of the retainer 52 The lower surface of the attachment portion 62 forms the bottom wall cover portion 66a.

A portion, which forms the bottom wall separated portion 66b, of the airbag 60 is a neighboring portion 63 in vicinity of the attachment portion 62 extending from the attachment portion 62 of the airbag 60 (see FIGS. 5A to 7, and 9). The vertical surface 67a and the horizontal surface 67b are formed from the external surface of the neighboring portion 63. A portion disposed to be in close contact with an external surface (outer circumferential surface) 56b of the reinforcing rib 56 of the retainer 52 is configured from an inner portion 63a of the neighboring portion 63 connected to the attachment portion 62. The vertical surface 67a is formed from the external surface. Herein, the horizontal surface 67b is configured from a lower surface obtained by forming the neighboring portion 63 in a planar shape when viewed in the right-left and front-rear directions of the folded body 65, so that a height dimension hi from the bottom wall cover portion 66a is constant. However, actually, the bottom surface 66 of the folded body 65 is configured to provide a wrinkle portion 63c formed by folding an outer portion 63b around the inner portion 63a of the neighboring portion 63 partially in the right-left and front-rear directions (see FIGS. 6 and 9). In the case of the embodiment, FIGS. 3, 4, 6, and the like illustrate a state of providing a gap. However, actually, the inner portion 63a, which is connected to the attachment portion 62, of the neighboring portion 63 has a single sheet shape without a wrinkle and a crease, and is in close contact with the outer surface (outer circumferential surface) 56b of the reinforcing rib 56 of the retainer 52.

In the case of the embodiment, the horizontal surface 67b of the stepped surface 67 is disposed at a position slightly higher than an upper end surface 56a of the reinforcing rib 56 of the retainer 52. The horizontal surface 67b on the outer circumferential side of the reinforcing rib 56 of the corner portion 53a of the retainer 52 is arranged as a small area (see FIGS. 4 and 9). For this reason, in the completely folded body 50 (folded body 65) of the embodiment, the recess portion 65d which is concave toward the inflow opening 61 is formed over the entire circumstance of the lower portion of an outer circumferential surface 68.

Figure 3:
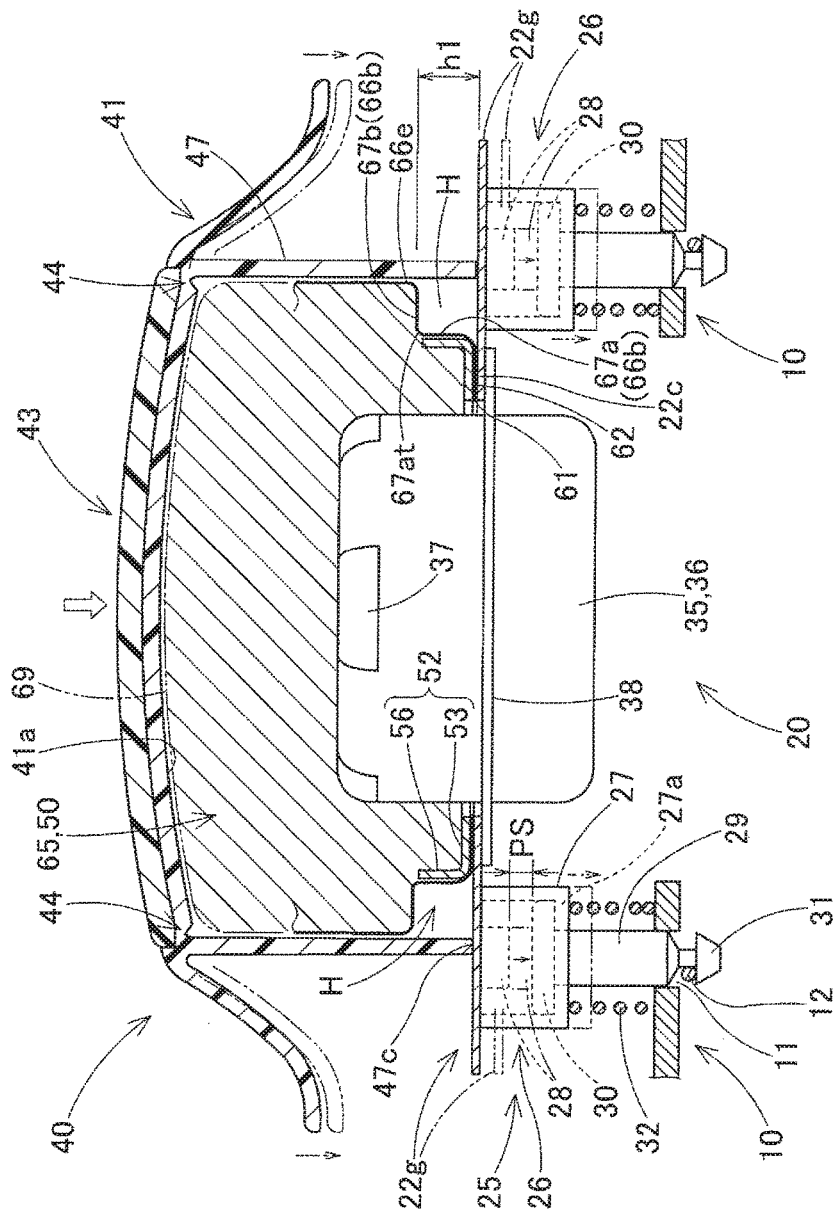
FIG. 3 is a schematic longitudinal sectional view illustrating the steering wheel storing the completely folded body of the embodiment, and corresponds to III-III portion of FIG. 1.

As illustrated in FIGS. 3 to 4, a ceiling surface 69 in the folded body 65 of the airbag 60 of the completely folded body 50 is in the state with almost no gap from a lower surface 41a of the ceiling wall portion 41 of the airbag cover 40, and is a curved surface corresponding to the lower surface 41a.

A storage recess portion 65a which is concave upward is formed in the center of the bottom surface 66 of the folded body 65 such that an upper portion 36a is easily stored in a main body portion 36, which is inserted into the airbag 60, of the inflator 35.

As illustrated in FIGS. 2 to 4, the inflator 35 includes the columnar main body portion 36, and the quadrangular annular flange portion 38 projects from the outer circumferential surface of the main body portion 36. The through hole 38a through which the bolt 55 of the retainer 52 penetrates is formed in the flange portion 38. A plurality of gas discharge outlets 37 discharging an inflation gas are arranged in the upper portion 36a of the flange portion 38 of the main body portion 36. When the completely folded body 50 and the inflator 35 are fixed in the airbag holder 21, the upper portion 36a is inserted into the storage recess portion 65a of the completely folded body (airbag 60) 50 through the communication opening 54 of the retainer 52 and the inflow opening 61 of the airbag 60.

As illustrated in FIGS. 1 to 4, the airbag cover 40 is made of synthetic resin such as an olefin-based thermoplastic elastomer, and is arranged on the upper surface of the boss portion B near the center of the steering wheel W. The airbag cover 40 includes the ceiling wall portion 41 which covers the upper sude of the completely folded body 50 stored inside the boss portion B in the state of being folded, and a side wall portion 47 which extends in an approximately cylindrical shape from the lower surface 41a of the ceiling wall portion 41, and covers the side surface (outer circumferential surface) 68 of the approximately columnar completely folded body 50 (folded body 65).

A disc-shaped door portion 42 which is operable forward by being pressed by the inflated airbag 60 is arranged in the ceiling wall portion 41. The door portion 42 is provided with a hinge portion 43 on the front edge side, and a thin rupture expected portion 44 which has an approximately arc shape in top view is provided therearound.

In the case of the embodiment, a synthetic-resin ornament 46 with an approximately disc shape is firmly fixed on the upper surface side of the door portion 42. When the door portion 42 is opened, the ornament 46 rotates integrally with the door portion 42.

Figure 10A:
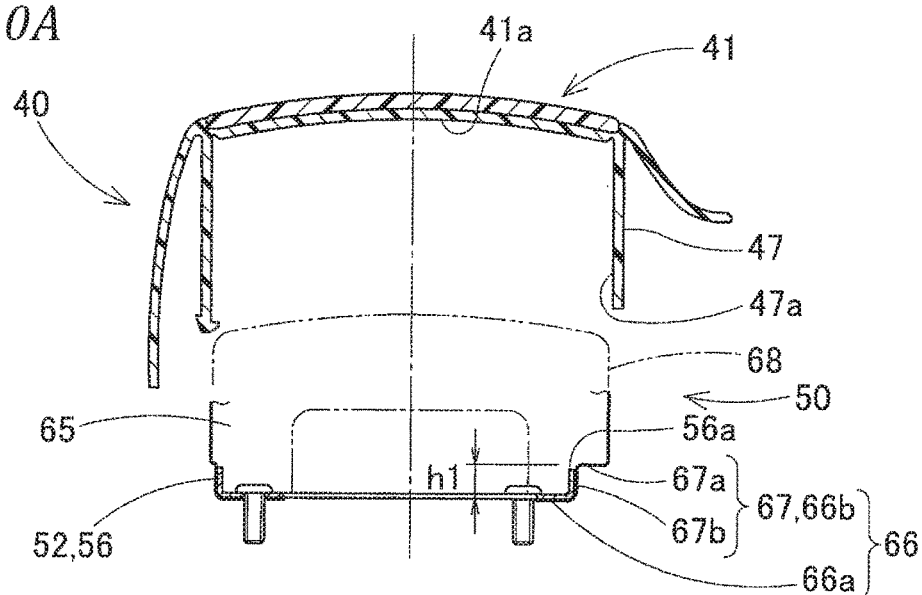
FIGS. 10A to 10C are diagrams illustrating a state where an airbag cover is fitted to the completely folded body of the embodiment.
Figure 10B:
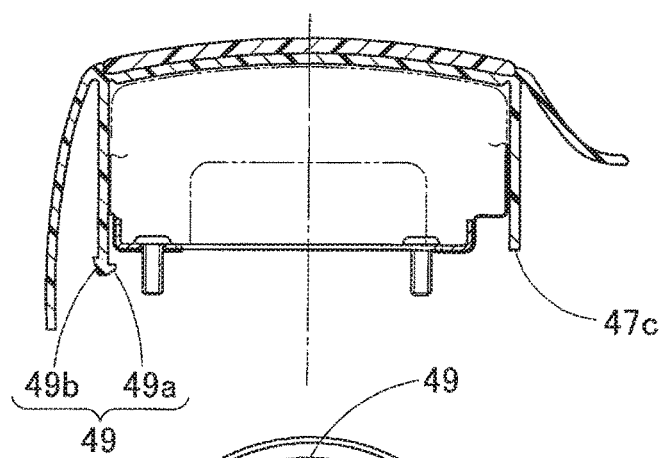
Figure 10C:
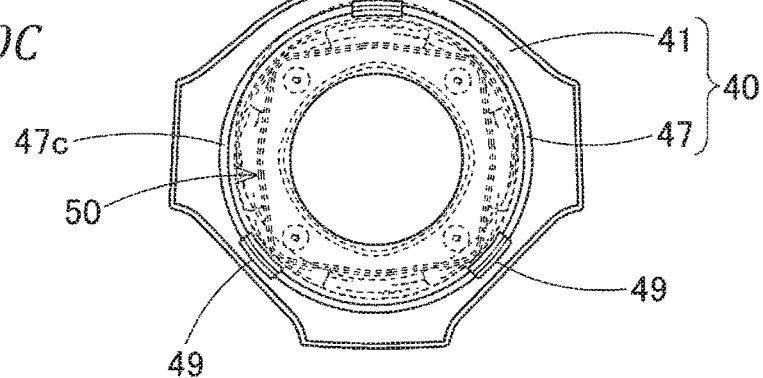

As illustrated in FIGS. 1, 4, and 10C, locking leg portions 49 coupled with the airbag holder 21 are arranged at three positions which are the front side and obliquely rear sides of right and left sides of the side wall portion 47 of the airbag cover 40. Each locking leg portion 49 projects to extends downward from a lower end surface 47c of the side wall portion 47, and is inserted into a locking hole 22e of the airbag holder 21 to be locked to the circumferential edge of the locking hole 22e. The locking leg portion 49 includes an inner protrusion 49a protruding from an inner circumferential surface 47a of the side wall portion 47 and an outer protrusion 49b protruding from an outer circumferential surface 47b of the side wall portion 47. After the locking leg portion 49 is inserted into the locking hole 22e, the inner protrusion 49a is locked by a tongue portion 22f deformed by bending, and the locking leg portion 49 is pressed by the tongue portion 22*f*. The outer protrusion 49*b* is locked by the circumferential edge of the outer edge side, which is separated from the inflator 35, of the locking hole 22*e*, whereby the airbag cover 40 is regulated not to come out upward so as to be locked in the airbag holder 21.

The side wall portion 47 is configured such that the lower end surface 47*c* between the locking leg portions 49 and 49 abuts on a base plate portion 22 of the airbag holder 21, and the locking leg portion 49 regulates the upward movement of the airbag holder 21. Therefore, the airbag cover 40 is fixedly attached to the airbag holder 21, whereby the vertical movement and front-rear and right-left movement of the airbag cover 40 is regulated.

The airbag holder 21 is configured as the storage portion of the folded body 65 and is made of metal plate. As illustrated in FIGS. 1 to 4, the airbag holder 21 holds the completely folded body 50, the inflator 35, and the airbag cover 40. The airbag holder 21 is configured as a metal plate member which attaches the airbag device 20 to the steering wheel body 1 by using the switch body 26. The airbag holder 21 includes the approximately annular base plate portion 22, and a side wall support portion 23 protruding upward from the outer circumferential edge of the base plate portion 22.

Locking portions 22*d* formed by penetrating the locking hole 22*e* provided with the tongue portion 22*f* are arranged in the front side and obliquely rear sides of right and left sides of the base plate portion 22. Approximately semi disc-shaped switch support portions 22*g* which fix each switch body 26 are arranged on the rear side and both of right and left side. The side wall support portion 23 is arranged in the outer circumferential surface 47*b* of the side wall portion 47 of the airbag cover 40 between the locking portion 22*d* and the switch support portion 22*g*. The side wall support portion 23 regulates the deformation of inflating the side wall portion 47 at the time of inflation of the airbag 60.

An approximately circular insertion hole 22*a* through which the lower side of the main body portion 36 of the inflator 35 is insertable and which corresponds to the inflow opening 61 of the airbag 60 is open in the center of the base plate portion 22. The four through holes 22*b* through which the bolts 55 of the retainer 52 penetrate is formed in the circumferential edge of the insertion hole 22*a*. The portion, which is provided with the through hole 22*b*, of the circumferential edge of the insertion hole 22*a*, serves as an attachment seat 22*c* for attaching the completely folded body 50 and the inflator 35 by using the retainer 52.

Three switch bodies 26 arranged in the switch support portions 22*g* form the horn switch mechanism (horn switch) 25 of the steering wheel W. As illustrated in FIGS. 2 and 3, the switch body 26 includes an approximately cylindrical cover 27, a moving-side contact portion 28, the assembly pin 29, and a coil spring 32. The cover 27 and the moving-side contact portion 28 are arranged in the switch support portion 22*g* of the airbag holder 21. The coil spring 32 is arranged between the fixing portion 10 of the cored bar 2 and the cover 27 so as to bias the cover 27 upward. The assembly pin 29 is arranged with a fixing-side contact portion 30 in the cover 27 such that the fixing-side contact portion 30 faces the moving-side contact portion 28 in the vertical direction. The locking head 31 on the lower end side is locked to the locking pin 12 arranged to the locking hole 11. The fixing-side contact portion 30 abuts on the upper surface of a bottom wall portion 27*a* in the cover 27 so that the fixing-side contact portion 30 is prevented from coming out downward from the cover 27. The locking pin 12 regulates that the assembly pin 29 comes out upward from the locking hole 11, and the bottom wall portion 27*a* of the cover 27 biased upward from the coil spring 32 regulates the downward movement of the fixing-side contact portion 30, whereby the vertical movement of the assembly pin 29 is regulated. Therefore, the assembly pin 29 is arranged to be fixed to the fixing portion 10 of the cored bar 2.

The moving-side contact portion 28 is conductive to the positive electrode of a horn operating circuit connected to the base plate portion 22. The fixing-side contact portion 30 is conductive to the cored bar 2 as a negative electrode of the horn operating circuit by interposing the locking head 31 and the locking pin 12 therebetween. For this reason, the airbag cover (pad) 40 and the airbag device 20 descend by an operating stroke (separation distance of contact portions 28 and 30) PS. Each switch body 26 of the horn switch mechanism 25 allows the moving-side contact portion 28 to descend together with the base plate portion 22 of the airbag holder 21 so that the moving-side contact portion 28 contacts the fixing-side contact portion 30, thereby operating a horn.

When a process to form the completely folded body 50 of the airbag 60 is described, in the embodiment, the pre-folded body 64 is formed by folding the airbag 60 by the airbag folding machine 70 illustrated in FIGS. 13 to 16 in a state where the retainer 52 is set inside the airbag 60. The folded body 65 provided with the stepped surface 67 is formed by using the airbag molding machines 80 and 90 illustrated in FIGS. 17 to 20. The approximately columnar completely folded body 50 is formed by performing the compression working to maintain the folded shape.

As illustrated in FIGS. 13 to 16, the airbag folding machine 70 includes a substrate 71, a ceiling wall portion 73 which is arranged to be vertically movable above the substrate 71, and two types of four pressing tools 75 and 76 which move to the center of the substrate 71 on the substrate 71. A set portion 72 having an assembly hole 72*a* into which each bolt 55 of the retainer 52 protruding from the airbag 60 is fitted is arranged in the center of the upper surface of the substrate 71. The set portion 72 on the upper surface of the substrate 71 serves as a molding surface 71*a* which forms the bottom surface 66 (bottom surface 64*a* of pre-folded body 64) before providing the stepped surface 67 of the folded body 65 of the airbag 60. The vicinity of the center of the lower surface of the ceiling wall portion 73 serves as a molding surface 73*a* which forms the ceiling surface 69 (a planar ceiling surface 64*b* of the pre-folded body 64) before providing the stepped surface 67 of the folded body 65. An approximately columnar convex portion 72*b* is arranged in the set portion 72 such that the storage recess portion 65*a* for storing the upper portion 36*a* of the inflator 35 is easily formed in the folded body 65. The set portion 72 is configured to reliably hold the bolt 55 of the retainer 52 so that a portion except the attachment portion 62 of the airbag 60 does not enter the lower surface 53*c* of the bottom wall portion 53 of the retainer 52 at the time of folding process.

The pressing tools 75 and 76 are alternately arranged in a circumferential direction centered on the set portion 72. Arc-shaped molding surfaces 75*a* and 76*a* which form the outer circumferential surface 68 (an outer circumferential surface 64*c* of the pre-folded body 64) before providing the stepped surface 67 of the folded body 65 are formed on the surface of the pressing tools 75 and 76 on the set portion 72 side.

A heater 78 as a heating unit is arranged in the substrate 71 and the ceiling wall portion 73 such that the temperature of the set airbag 60 can rise to 50° C. or more (about 50 to 90° C.). The heater 78 is properly arranged also in the pressing tools 75 and 76.

At the time of using the airbag folding machine 70, in advance, each bolt 55 is set to protrude from the through hole 62*a*, and the retainer 52 is arranged in the attachment portion 62 of the airbag 60. As illustrated in FIG. 13, each bolt 55 is fitted into the assembly hole 72*a* of the set portion 72, the driver-side panel 60*b* is overlapped on the vehicle-side panel 60*c*, and the airbag 60 becomes in the state of being in parallel on the substrate 71. Then, the ceiling wall portion 73 is disposed at a position of a predetermined height from the substrate 71 to form the ceiling surface 64*b* of the pre-folded body 64 (see FIG. 14). As illustrated in FIG. 15, each pressing tool 75 is moved toward the set portion 72 so that the outer circumferential edge 60*d* of the airbag 60 is gathered to the upper side of the retainer 52. Then, as illustrated in FIG. 16, each pressing tool 76 is moved toward the set portion 72 so that the remaining part of the outer circumferential edge 60*d* of the airbag 60 is gathered to the upper side of the retainer 52.

The airbag 60 is formed to the approximately columnar pre-folded body 64 before providing the stepped surface 67 by the molding surface 71*a* on the upper surface of the substrate 71 near the set portion 72, the molding surface 73*a* near the center of the lower surface of the ceiling wall portion 73, and the molding surfaces 75*a* and 76*a* of the pressing tools 75 and 76.

Figure 17:
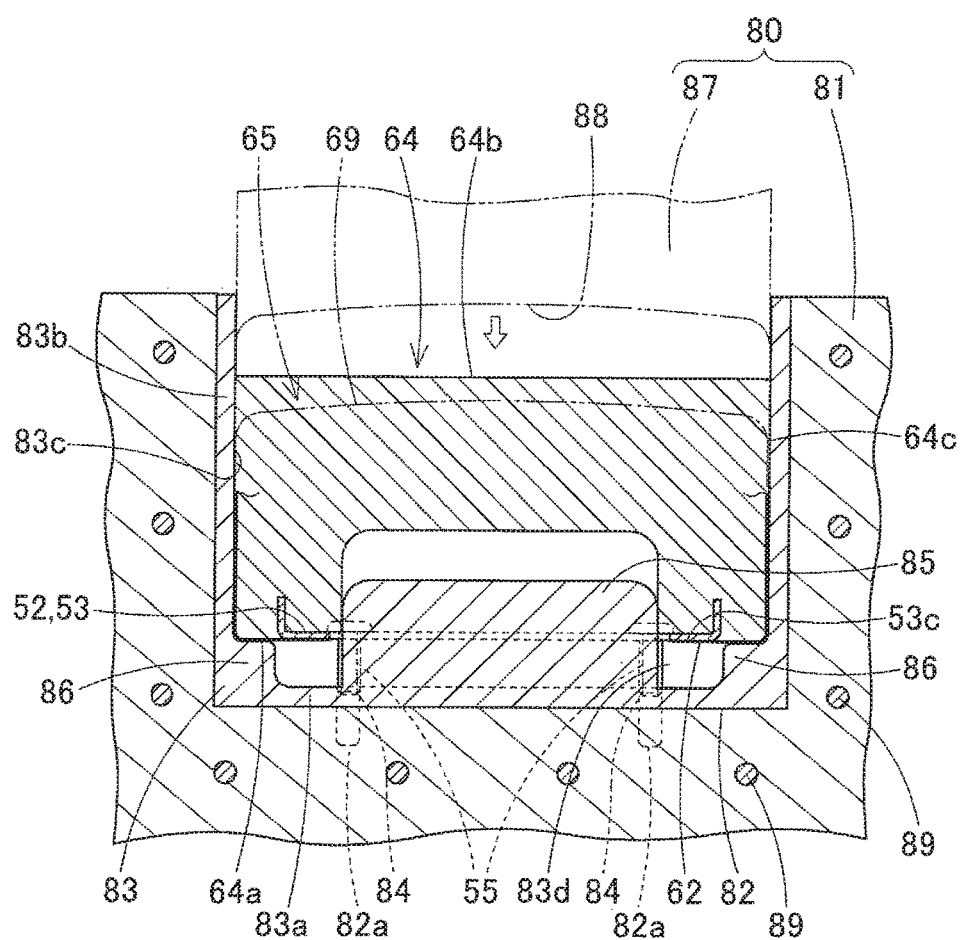
FIG. 17 is a diagram illustrating a process for forming the completely folded body of the embodiment.
Figure 18:
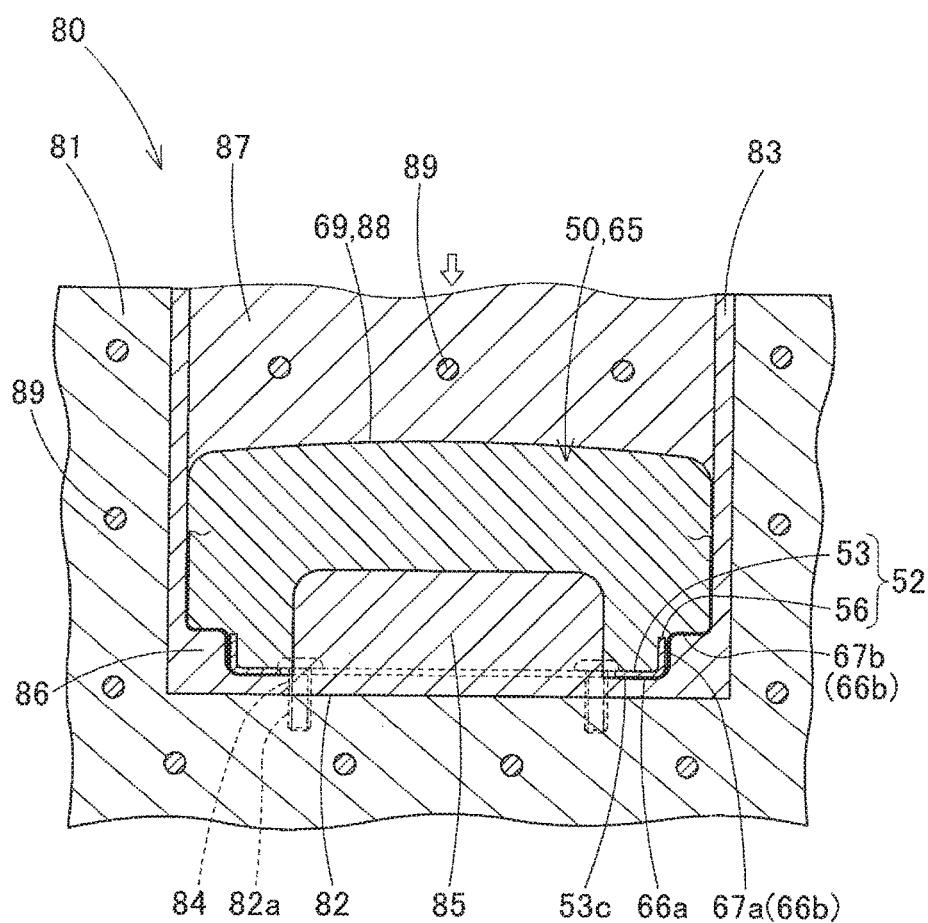
FIG. 18 is a diagram illustrating a process for forming the completely folded body of the embodiment, and illustrates a process subsequent to the process of FIG. 17.

As illustrated in FIGS. 17 and 18, the airbag molding machine 80 heats and compresses the pre-folded body 64, and forms the folded body 65 provided with the stepped surface 67 above the bottom wall portion 53 of the retainer 52. The airbag molding machines 80 is called an airbag heat-compressing machine. In the case of the embodiment, a holding frame portion 83, which is made of metal such as steel excellent in thermal conductivity, is used. The airbag heat-compressing machine (airbag molding machine 80) includes a molding body portion 81 having the set portion 82 storing the holding frame portion 83, and a pressing-side portion 87 which is vertically movable.

The holding frame portion 83 is provided with the cylindrical-shaped side wall portion 83*b* upward from the outer circumferential edge of an approximately circular bottom wall portion 83*a*. A storage recess portion 83*d* into which the pre-folded body 64 assembled with the retainer 52 is fitted is provided in the holding frame portion 83. The assembly hole 84 through which each bolt 55 of the retainer 52 penetrates is provided in the bottom wall portion 83*a*. A storage convex portion 85 which is capable of forming the storage recess portion 65*a* and protrudes in an approximately columnar shape is arranged in the center of the bottom wall portion 83*a*. An approximately annular step convex portion 86 for forming the recess portion 65*d* as the stepped surface 67 is arranged in the outer circumferential edge of the bottom wall portion 83*a*. The inner circumferential surface of the side wall portion 83*b* serves as the molding surface 83*c* which forms the outer circumferential surface 68 of the folded body 65.

The assembly hole 82*a* which is capable of storing each bolt 55 of the retainer 52 is formed in the set portion 82 which stores the holding frame portion 83 of the molding body portion 81.

A pressing surface 88 forming the curved-shaped ceiling surface 69 of the folded body 65 is arranged on the lower surface of the pressing-side portion 87.

A heater 89 as the heating unit is arranged in the molding body portion 81 and the pressing-side portion 87 such that the temperatures of the set pre-folded body 64 and the holding frame portion 83 can rise to 100° C. or more (about 100 to 150° C.).

As illustrated in FIG. 17, at the time of using the airbag heat-compressing machine 80, the pre-folded body 64 is disposed on the bottom wall portion 83*a* such that each bolt 55 protrudes from the assembly hole 84. The pre-folded body 64 is stored in the holding frame portion 83, and the holding frame portion 83 is set to the set portion 82 of the molding body portion 81. As illustrated in FIG. 18, the pressing-side portion 87 is inserted into the set holding frame portion 83, the pre-folded body 64 is compressed and heated, and the compressed and heated state maintains for about 1 to 2 hours. The temperatures of the molding body portion 81 and the pressing-side portion 87 may be raised by the heater 89 before setting the pre-folded body 64, and may be risen at the time of starting compression, or during compression.

When the predetermined time elapses, the folded body 65 formed in a predetermined folded shape by being assembled with the retainer 52, that is, the completely folded body 50 is formed in the holding frame portion 83. Herein, in the case of the embodiment, in order not to collapse the folded shape of the airbag 60 of the completely folded body 50, the completely folded body 50 is maintained in a compressed state and cooled by using the airbag molding machines (airbag cool-compressing machine) 90.

Figure 19:
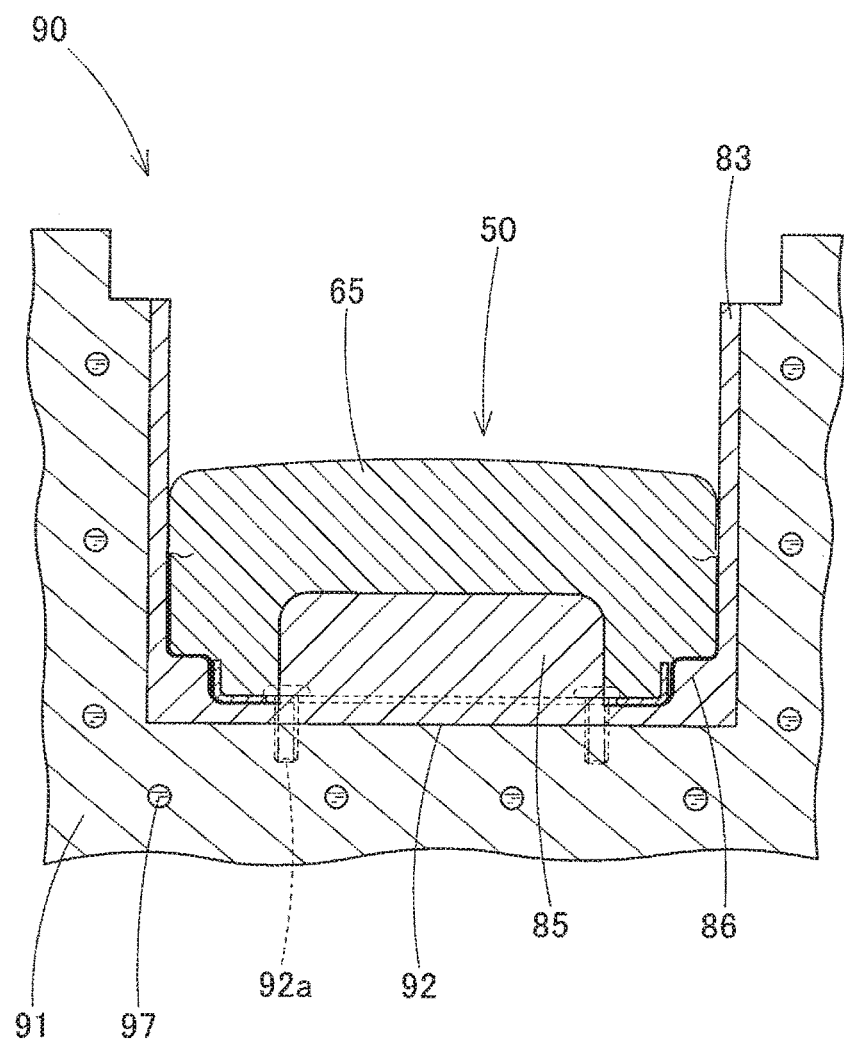
FIG. 19 is a diagram illustrating a process for forming the completely folded body of the embodiment, and illustrates a process subsequent to the process of FIG. 18.
Figure 20:
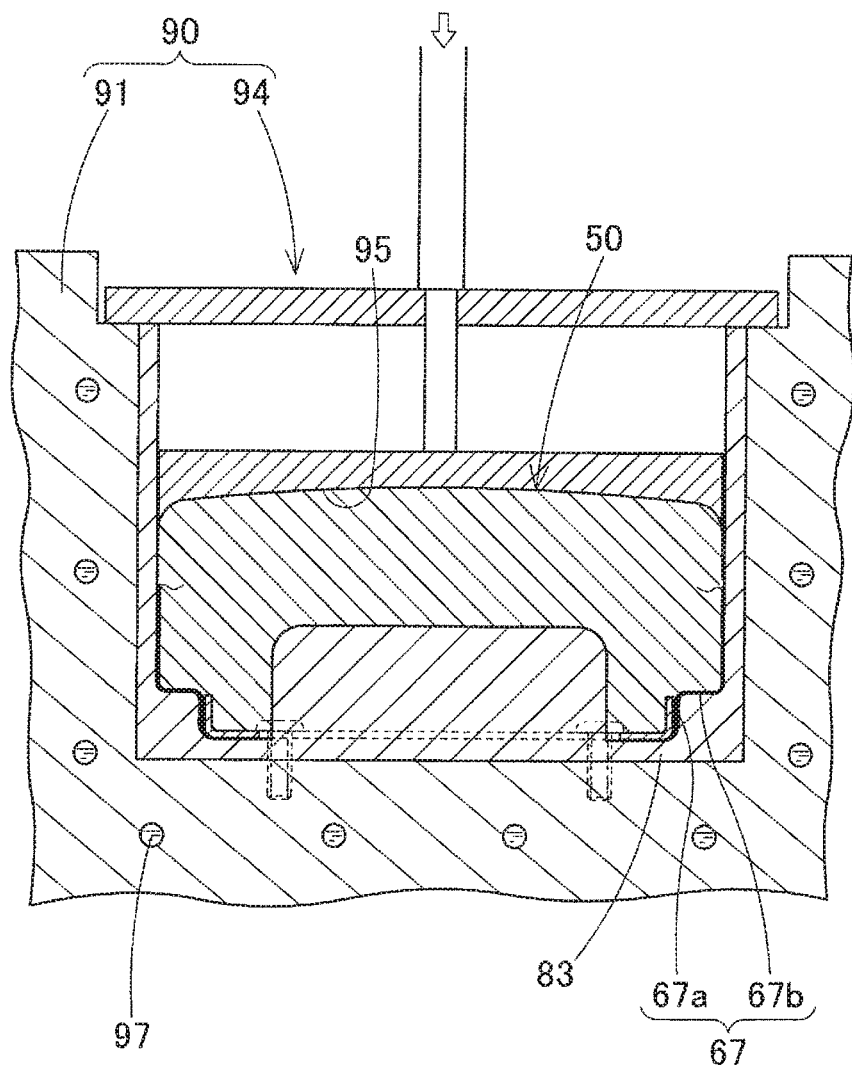
FIG. 20 is a diagram illustrating a process for forming the completely folded body of the embodiment, and illustrates a process subsequent to the process of FIG. 19.

As illustrated in FIGS. 19 and 20, the airbag cool-compressing machine 90 includes the molding body portion 91 having the set portion 92 storing the holding frame portion 83, and the pressing-side portion 94 which is vertically movable. The assembly hole 92*a* which is capable of storing each bolt 55 of the retainer 52 is formed in the set portion 92 storing the holding frame portion 83 of the molding body portion 91. The pressing surface 95 forming the curved-shaped ceiling surface 69 of the folded body 65 is arranged on the lower surface of the pressing-side portion 94.

A cooling water passage 97 as a cooling unit is arranged in the molding body portion 91 such that the set completely folded body 50 and the holding frame portion 83 can be cooled to 40° C. or less about 5 to 40° C.).

As illustrated in FIG. 19. at the time of using the airbag cool-compressing machine 90, the holding frame portion 83 having stored the completely folded body 50 extracted from the airbag heat-compressing machine 80 is set to the set portion 92 of the molding body portion 91. As illustrated in FIG. 20, the pressing-side portion 94 is inserted into the set holding frame portion 83, the completely folded body 50 is compressed and cooled, and the compressed and cooled state maintains for about 20 to 50 minutes. The molding body portion 91 may be cooled by the cooling water passage 97 before setting the completely folded body 50, and may be cooled at the time of starting compression, or during compression.

Figure 6:
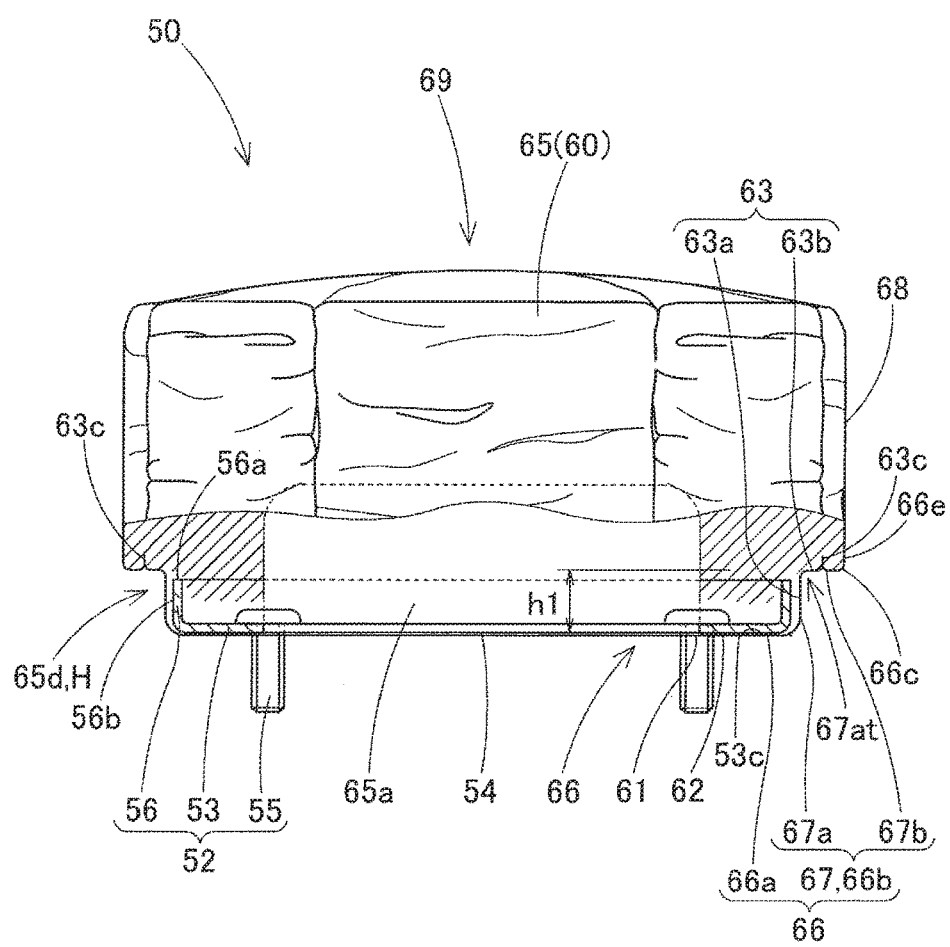
FIG. 6 is a schematic partially longitudinal sectional view illustrating the completely folded body of the embodiment.
Figure 7:
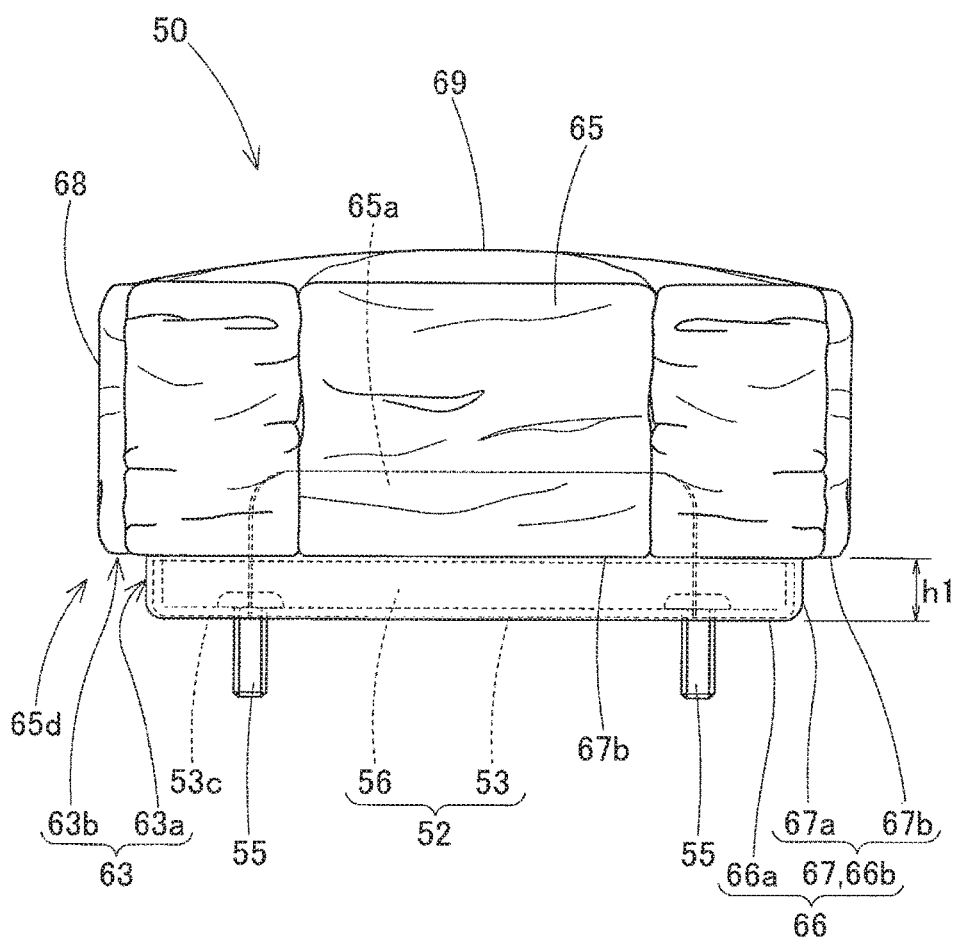
FIG. 7 is a schematic front view illustrating the completely folded body of the embodiment.
Figure 8:
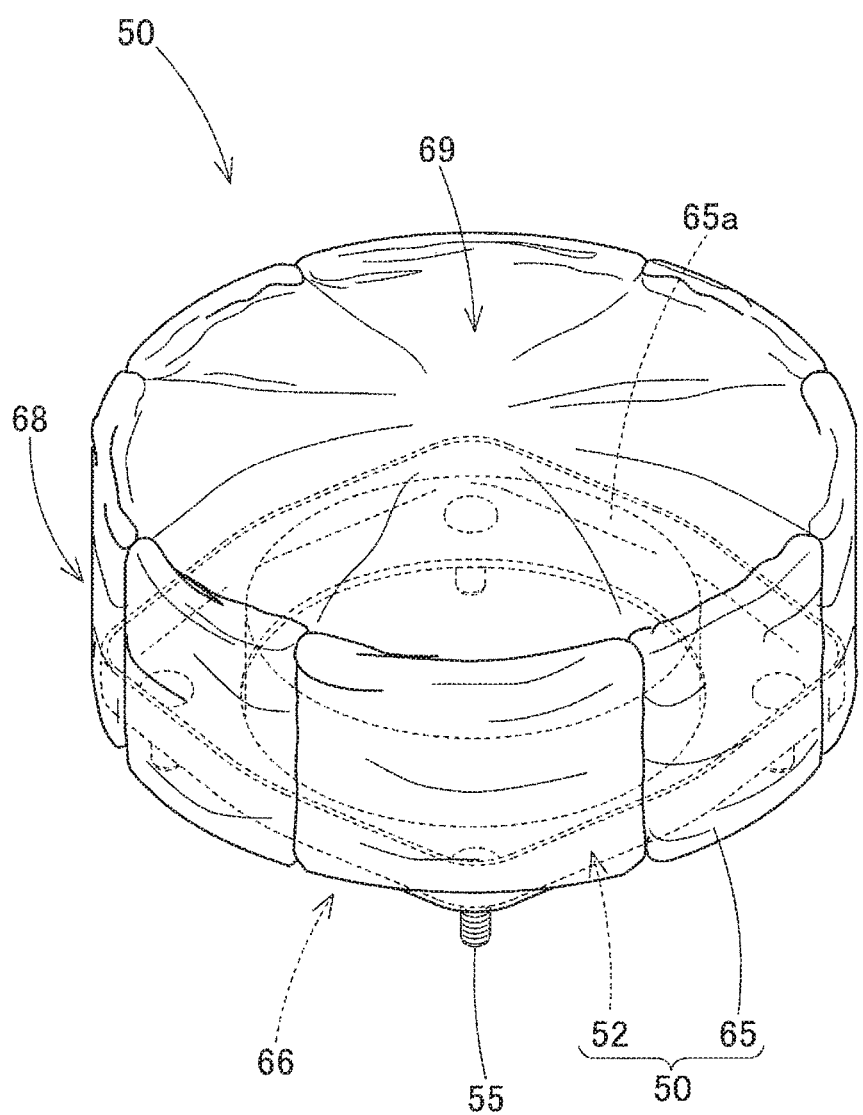
FIG. 8 is a schematic perspective view illustrating the completely folded body of the embodiment.
Figure 9:
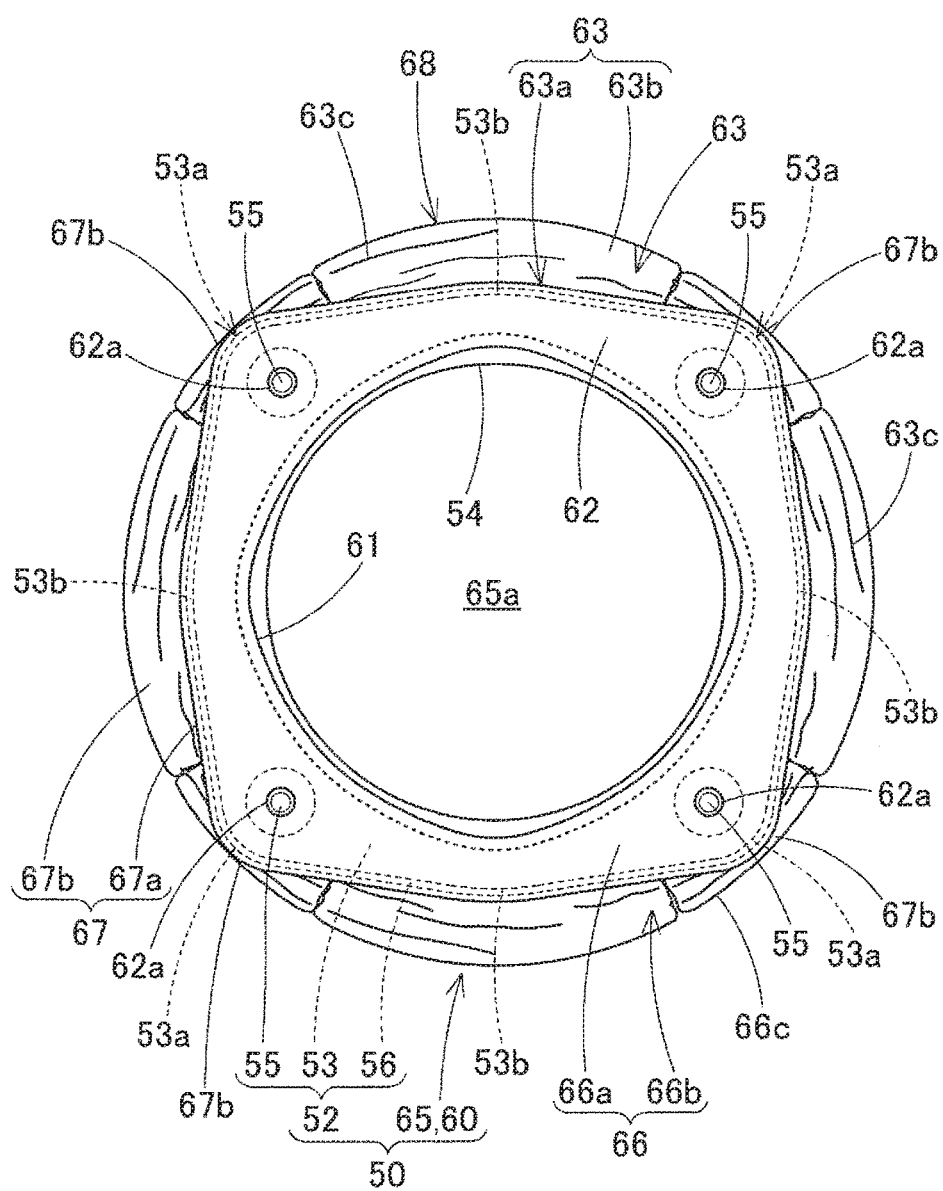
FIG. 9 is a schematic bottom surface view illustrating the completely folded body of the embodiment.

When the predetermined time elapses, the folded body 65 formed in a predetermined folded shape by being assembled with the retainer 52, that is, the completely folded body 50 having durability to maintain the folded shape is formed in the holding frame portion 83. As illustrated in FIGS. 6, 7, and 9, the bottom wall cover portion 66*a* and the bottom wall separated portion 66*b* provided with the stepped surface 67 are formed in the bottom surface 66 of the folded body 65 of the completely folded body 50. Specifically, the attachment portion 62 of the airbag 60 is disposed in a sheet shape of a single plate in the lower surface 53*c* of the bottom wall portion 53 of the retainer 52 without providing a crease, a wrinkle, and the like. The lower surface forms the quadrangular annular bottom wall cover portion 66a. The inner portion 63a, in a sheet shape of a single plate, of the neighboring portion 63 of the airbag 60 covers the outer surface (outer circumferential surface) 56b of the reinforcing rib 56 to pass over the upper end surface 56a of the reinforcing rib 56. The external surface thereof forms the vertical surface 67a of the stepped surface 67 in the bottom wall separated portion 66b. The outer portion 63b of the neighboring portion 63 of the airbag 60 is folded such that the height dimension hi from the bottom wall cover portion 66a is constant, and the outer portion 63b extends from the vertical surface 67a to the outer circumferential edge 66c of the bottom wall separated portion 66b. The lower surface thereof parallel with the bottom wall portion 53 and the bottom wall cover portion 66a forms the horizontal surface 67b of the stepped surface 67 of the bottom wall separated portion 66b.

When the airbag device 20 mounted with the completely folded body 50 is assembled, first, as illustrated in FIGS. 10A to 10C, the completely folded body 50 is fitted to the inner circumferential surface 47a of the side wall portion 47 of the airbag cover 40.

At this time, in the completely folded body 50, the stepped surface 67 is provided in the bottom wall separated portion 66b around the bottom wall cover portion 66a of the bottom surface 66 of the folded body 65. The horizontal surface 67b of the stepped surface 67 is arranged at a position of the height dimension h1 offset above the bottom wall cover portion 66a (in the embodiment, above the upper end surface 56a of the reinforcing rib 56) covering the lower surface of the bottom wall portion 53 of the retainer 52. For this reason, unlike FIG. 12, the neighboring portion 66e of the bottom wall separated portion 66b of the airbag 60 may not be disposed below the bottom wall portion 53 of the retainer 52, or a jammed portion 66f formed by jamming the neighboring portion 66e of the bottom wall separated portion 66b of the airbag 60 may not be provided between the outer surface 56b of the reinforcing rib 56 of the retainer 52 and the inner circumferential surface 47a of the side wall portion 47 of the airbag cover 40.

Figure 11A:
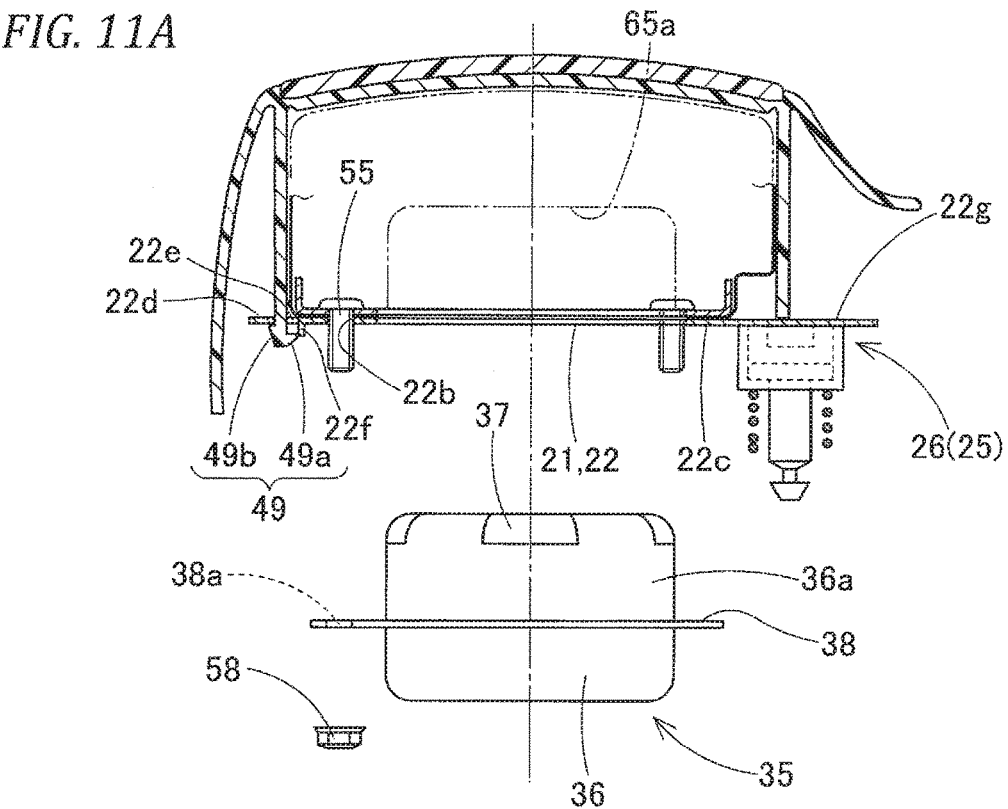
FIGS. 11A and 11B are diagrams illustrating a state where the completely folded body of the embodiment is attached to an airbag holder after fitting the airbag cover.

As illustrated in FIG. 11A, each bolt 55 of the completely folded body 50 penetrates through the through hole 22b of the airbag holder 21, and each locking leg portion 49 of the airbag cover 40 is inserted into the locking hole 22e of the airbag holder 21. Each tongue portion 22f is bent outward to be locked to the inner protrusion 49a of the locking leg portion 49 (see FIG. 11B), and the outer protrusion 49b of the locking leg portion 49 is locked to the circumferential edge on the outer edge side of the locking hole 22e, whereby the airbag cover 40 is attached to the airbag holder 21. In the airbag holder 21, the switch bodies 26 have already attached.

Figure 11B:
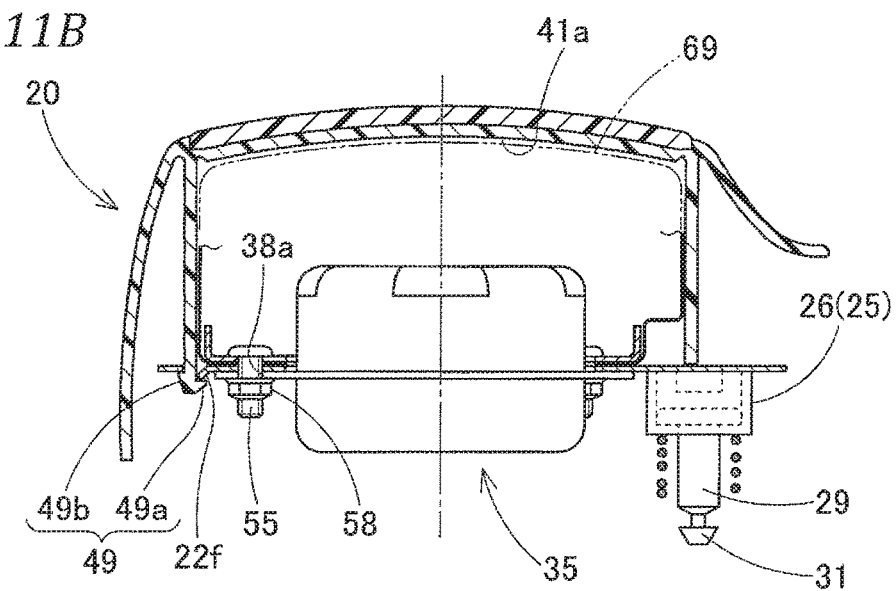

After that, as illustrated in FIG. 11B, each bolt 55 protruding from the airbag holder 21 penetrates through the through hole 38a of the inflator 35, the nut 58 is tightened to each bolt 55, and the completely folded body 50 and the inflator 35 are fixedly attached to the airbag holder 21 having been attached with the airbag cover 40, whereby the airbag device 20 can be assembled.

In mounting the airbag device 20 on the vehicle, the locking head 31 of the assembly pin 29 of each switch body 26 is inserted into the locking hole 11 of the fixing portion 10 of the steering wheel body 1 having been assembled to the steering shaft SS, and the locking head 31 is locked by the locking pin 12, whereby the airbag device 20 can be attached to the steering wheel body 1. Then, the assembly of the steering wheel W is completed, and the steering wheel W can be mounted on the vehicle together with the airbag device 20.

When the airbag device 20 is attached to the steering wheel body 1, a lead wire (not illustrated) of the airbag holder 21 is connected to the positive electrode of the horn switch operating circuit, and the lead wire (not illustrated) for inputting an operating signal is connected to the inflator 35.

After mounting on the vehicle, when the operating signal is input to the inflator 35, the inflator 35 discharges the inflation gas from the gas discharge outlet 37. Accordingly, the folded airbag 60 is inflated by allowing the inflation gas to flow therein, presses and opens the door portion 42 of the ceiling wall portion 41 of the airbag cover 40, protrudes from the opened opening of the door portion 42, and is deployed and inflated to cover the upper surface of the ring portion R from the upper side of the boss portion B (see the two-dot chain lines of FIGS. 1 and 2).

In normal use at the time of non-operation of the inflator 35, when the airbag cover 40 is pressed down by the operating stroke PS in order to operate the horn switch mechanism 25, the moving-side contact portion 28 of the switch body 26 abuts on the fixing-side contact portion 30 in contact manner. Then, the horn switch operating circuit is turned ON such that a predetermined horn is operated.

In the completely folded body 50 of the embodiment, the stepped surface 67 is arranged in a portion, which is connected from the bottom wall cover portion 66a, of the bottom wall separated portion 66b of the bottom surface 66 of the folded body 65. The stepped surface 67 includes the vertical surface 67a bent upward from the bottom wall cover portion 66a, and the horizontal surface 67b which is disposed above the bottom wall cover portion 66a from the upper end 67at of the vertical surface 67a, and extends toward the outer circumferential edge 66c of the bottom wall separated portion 66b. That is, when the horizontal surface 67b of the stepped surface 67 is arranged in a position where a jam hardly occurs, a gap H is provided to be separated, by a distance difference (height dimension h1) which is offset upward from the bottom wall cover portion 66a, upward from the base plate portion 22, to which the bolt 55 as the fixing unit is fixed, of the airbag holder 21 as the storage portion (see FIG. 3). Therefore, it can be prevented that the stepped surface 67 of the bottom wall separated portion 66b or the portion 66e adjacent thereto is jammed between the base plate portion 22 of the airbag holder 21 and the bottom wall portion 53 of the retainer 52.

Figure 12:
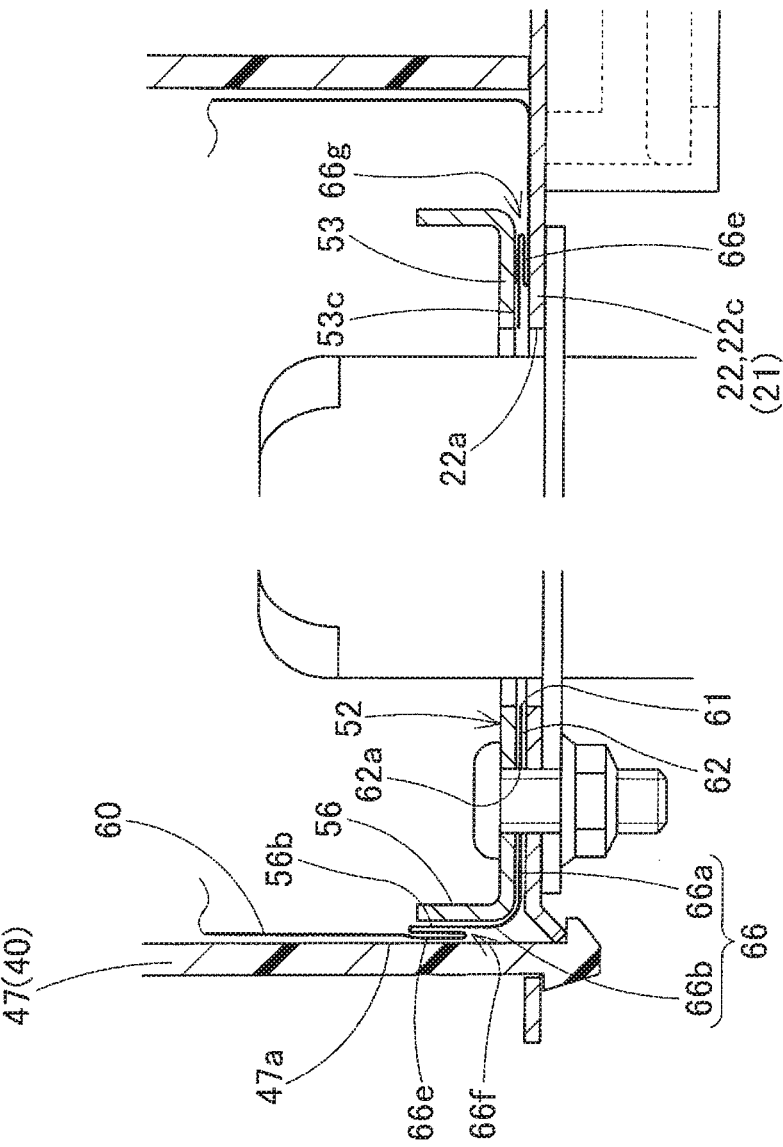
FIG. 12 is a diagram illustrating a state where the airbag is jammed.

Incidentally, when the gap H is not provided between the bottom wall separated portion 66b around the bottom wall cover portion 66a and the base plate portion 22 unlike the above description, as illustrated in FIG. 12, a jammed portion 66g formed by jamming the neighboring portion 66e of the bottom wall separated portion 66b of the airbag 60, as well as the bottom wall cover portion 66a, may be formed between the bottom wall portion 53 of the retainer 52 and the attachment seat 22c of the base plate portion 22. When the jammed portion 66g is formed, the airbag 60 cannot be inflated in a predetermined completely-inflated shape, or the airbag 60 may be partially broken.

Therefore, in the completely folded body 50 of the airbag 60 of the embodiment, it can be prevented that an unexpected jam occurs between the retainer 52 in the airbag 60 and the attachment seat 22c of the airbag holder 21.

In the embodiment, the stepped surface 67 of the completely folded body 50 is arranged in the entire area of the bottom wall separated portion 66b of the folded body 65.

For this reason, in the embodiment, since the stepped surface 67 is arranged in the entire circumference around the bottom wall cover portion 66a, that is, the entire portion around the retainer 52, it can be more reliably prevented, compared with the case of being partially disposed, that the bottom wall separated portion 66b or the portion 66e adjacent thereto is jammed between the attachment seat 22c of the base plate portion 22 of the airbag holder 21 and the bottom wall portion 53 of the retainer 52.

In the embodiment, the horizontal surface 67b of the stepped surface 67 of the completely folded body 50 is disposed to be positioned at a height equal to or higher than the upper end surface 56a of the reinforcing rib 56 of the retainer 52.

That is, when the horizontal surface 67b of the stepped surface 67 is higher than the bottom wall cover portion 66a so that the gap H from the base plate portion 22 becomes large, it can be further prevented in proportion to increase of the height that the bottom wall separated portion 66b or the portion 66e adjacent thereto is jammed between the attachment seat 22c of the base plate portion 22 and the bottom wall portion 53 of the retainer 52.

Specifically, as in the embodiment, when the horizontal surface 67b of the stepped surface 67 is disposed with the height dimension hi from the bottom wall cover portion 66a to be positioned at a height equal to or higher than the upper end surface 56a of the reinforcing rib 56 of the retainer 52, and the side wall portion 47 of the airbag cover 40 for covering the completely folded body 50 is fitted to the outer circumferential side of the completely folded body 50, only the portion (an inner portion 63a6 of the neighboring portion 63 near the attachment portion 62 of the airbag 60), which is connected with the bottom wall cover portion 66a, of the vertical surface 67a of the stepped surface 67 in the bottom wall separated portion 66b of the folded body 65 is disposed on the outer circumferential surface 56b of the reinforcing rib 56 of the retainer 52. Therefore, it can be prevented the jam of the airbag 60 (the bottom wall separated portion 66b or the portion 66e adjacent thereto) between the reinforcing rib 56 and the side wall portion 47 of the airbag cover 40, for example, the deformation of the completely-inflated shape.

Figure 21A:
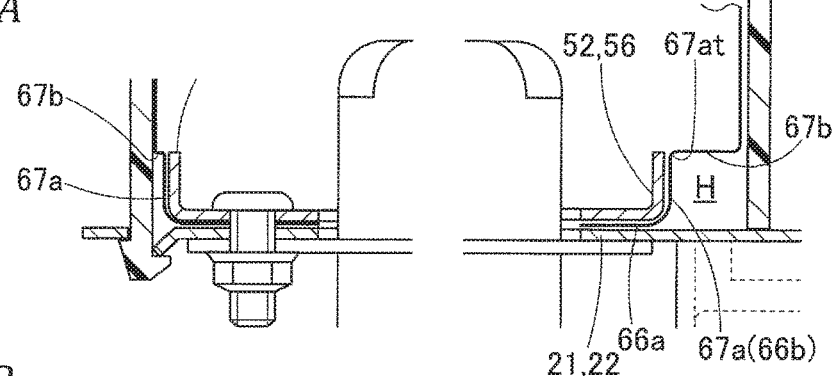
FIGS. 21A to 21C are schematic longitudinal sectional views illustrating a modification example of the completely folded body of the embodiment.
Figure 21B:
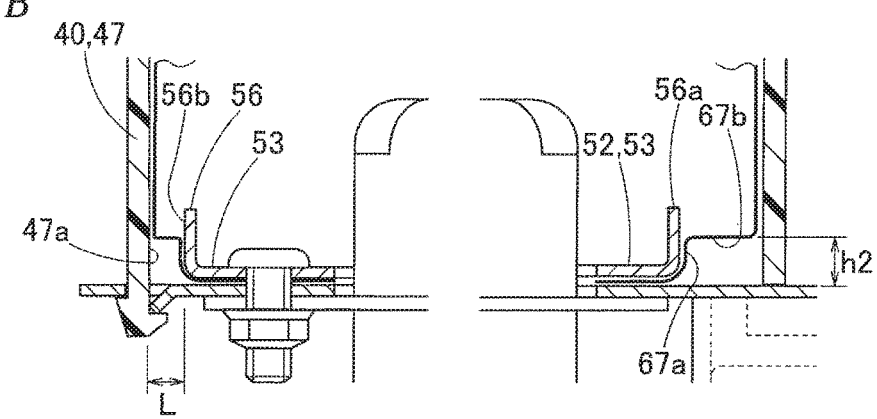

Of course, if the folded shape of the folded body 65 is firm, as illustrated in FIG. 21A, the horizontal surface 67b of the stepped surface 67 may be positioned at the same height as the upper end surface 56a of the reinforcing rib 56 of the retainer 52. Alternatively, as illustrated in Fig. 21B, the horizontal surface 67b of the stepped surface 67 may be disposed to be positioned at a height dimension 112 from the bottom wall portion 53 of the retainer 52 to the upper end surface 56a of the reinforcing rib 56. Alternatively, as illustrated in FIG. 21C, the horizontal surface 67b of the stepped surface 67 may be disposed to be positioned at a height dimension h3 from the bottom wall cover portion 66a to the upper surface 53d of the bottom wall portion 53.

Figure 21C:
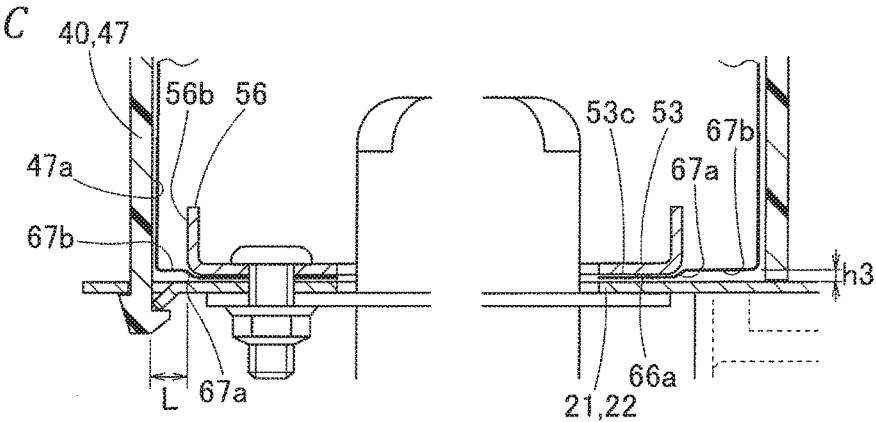

As illustrated in FIGS. 21B and 21C, in the horizontal surface 67b of the stepped surface 67, when a distance L between the outer surface 56b of the reinforcing rib 56 and the inner circumferential surface 47a of the side wall portion 47 of the airbag cover 40 is large, although some portions (the bottom wall separated portion 66b or the portion 66e adjacent thereto) of the airbag 60 are jammed between the reinforcing rib 56 and the side wall portion 47 of the airbag cover 40, the jam is easily resolved by being stretched at the time of inflation of the airbag 60, and thus it is not necessary to consider the jam of the airbag 60 between the reinforcing rib 56 and the side wall portion 47 of the airbag cover 40.

Therefore, as illustrated in FIGS. 21B and 21C, by considering only the jam between the bottom wall portion 53 of the retainer 52 and the attachment seat 22c of the base plate portion 22 of the airbag holder 21, the horizontal surface 67b of the stepped surface 67 may be arranged with the height dimension from the attachment seat 22c set as h2 or h3.

In the embodiment, a case has been described in which the stepped surface 67 of the completely folded body 50 is disposed on the entire circumference around the bottom wall cover portion 66a, that is, the entire portion around the retainer 52. However, the stepped surface 67 may be partially provided in correspondence to the portion which has a risk that a portion of the airbag 60 is jammed between the bottom wall portion 53 of the retainer 52 and the attachment seat 22c of the airbag holder 21, and the portion which has a risk that a portion of the airbag 60 is jammed between the reinforcing rib 56 of the retainer 52 and the inner circumferential surface 47a of the side wall portion 47, which covers the periphery of the completely folded body 50, of the airbag cover 40, and the horizontal surface 67b may be arranged to be positioned at a predetermined height.

In the embodiment, a configuration has been exemplified in which the inner portion 63a of the neighboring portion 63 of the attachment portion 62 of the airbag 60 is used as a portion forming the vertical surface 67a of the stepped surface 67, and the portion has a single sheet shape without a wrinkle or a crease and is in close contact with the outer surface 56b of the reinforcing rib 56 of the retainer 52. However, the portion (attachment portion) 62 of the bottom wall cover portion 66a may be in close contact with the lower surface 53c of the bottom wall portion 53 of the retainer 52 in the state without any wrinkle and crease, or when the gap H is arranged between the base plate portion 22 of the airbag holder 21 and the horizontal surface 67b of the stepped surface 67, the inner portion 63a may be arranged on the outside of the outer surface 56b of the reinforcing rib 56 of the retainer 52 with a wrinkle or a crease. It is because when the gap H is provided, the inner portion 63a is stretched and extends at the time of inflation of the airbag 60 so at to resolve the wrinkle or the crease, and the airbag 60 can be inflated in a predetermined shape.

In the embodiment, the stepped surface 67 is formed through compression molding with heat by using the airbag molding machines 80 and 90. However, the shape of an almost stepped surface may be formed after folding is performed by using the airbag folding machine 70.

When the stepped surface 67 has been formed through the compression molding with heat by using the airbag molding machines 80 and 90, the storage convex portion 85 and the step convex portion 86 of the holding frame portion 83 may be configured to be exchangeable to have a predetermined shape or size, so that the storage recess portion 65a of the completely folded body 50 or the stepped surface 67 is properly adjusted in shape or dimension.

In the embodiment, the completely folded body 50 is exemplified as an approximately columnar shape. However, the completely folded body 50 may be formed by folding the airbag 60 in a multangular pillar shape such as a rectangular pillar shape.

In the embodiment, at the time of folding the airbag 60, the driver-side panel 60b and the vehicle-side panel 60c are deployed in parallel with each other, and the outer circumferential edge 60d is folded to be gathered toward the retainer 52. However, when the airbag is folded to be gathered to the upper side of the bottom wall portion of the retainer, the airbag may be folded from the inflated state to be gathered to the upper side of the bottom wall portion of the retainer by extracting a gas, or the airbag may be folded to be gathered to the upper side of the bottom wall portion of the retainer by twisting. The folding of the airbag 60 is not limited to the embodiment.

In the embodiment, the formed completely folded body 50 is assembled with the airbag cover 40 and the like without providing a wrapping sheet covering the periphery thereof. However, the completely folded body 50 may be properly wrapped by a wrapping sheet or the like which ruptures at the time of inflation of the airbag 60, and then be assembled with the airbag cover 40 and the like. In order to further prevent the collapse of folding, the completely folded body 50 may be sprayed with an adhesive or a gluing agent to glue the completely folded body 50, and be assembled with the airbag cover 40 and the like (while not performed in the embodiment).

In the embodiment, the description has been given about the completely folded body 50 which is used in the airbag device 20 mounted on the steering wheel W. However, as long as a retainer having a projecting bolt and the like as the fixing unit is assembled, and the airbag is folded to be gathered to the upper side of the bottom wall portion of the retainer, the invention may be applied to a completely folded body used in a passenger seat airbag device and the like.

What is claimed is:

1. An airbag assembly comprising:
   a folded body of an airbag having an inflow opening through which an inflation gas is allowed to flow; and
   a retainer which is assembled to the folded body in order to attach the folded body to a storage portion, the retainer including:
      an annular bottom wall portion having a communication opening, which is open in correspondence to the inflow opening, in a center;
      a plurality of fixing units which protrude downward from the annular bottom wall portion, which is centered on the communication opening, around the communication opening, and are fixed to the storage portion;
      a reinforcing rib which is arranged to stand from an outer circumferential edge of the annular bottom wall portion; and
   an airbag cover that includes a side wall portion that surrounds the folded body of the airbag, the side wall portion of the airbag cover includes an upper end and a lower end located closer to the annular bottom wall portion of the retainer than the upper end, wherein
   the annular bottom wall portion of the retainer is disposed in a circumferential edge of the inflow opening on an inner circumferential surface side of the airbag, and is arranged in the airbag in a state where one or more of the plurality of fixing units protrudes outside the airbag;
   the folded body of the airbag is configured in such a folded shape that the airbag is folded to be gathered to an upper side of the retainer in a state where the circumferential edge of the inflow opening is disposed on a lower surface of the annular bottom wall portion of the retainer;
   the folded body is attached to the storage portion by fixing the one or more fixing units, protruding outside of the airbag, with an attachment seat of the storage portion so as to attach the circumferential edge of the inflow opening to the attachment seat of the storage portion;
   the folded body is arranged, on a bottom surface side, with a bottom wall cover portion which is disposed on the lower surface of the annular bottom wall portion of the retainer and a bottom wall separated portion which extends from the bottom wall cover portion and is disposed around the annular bottom wall portion of the retainer;
   a portion, which is connected from the bottom wall cover portion, of the bottom wall separated portion includes a stepped surface having a vertical surface bent upward from the bottom wall cover portion, and a lower-most horizontal surface with respect to the lower end of the airbag cover, the lower-most horizontal surface is disposed above the bottom wall cover portion from an upper end of the vertical surface, disposed above the lower end of the airbag cover, extends toward an outer circumferential edge of the bottom wall separated portion, and is separated from a portion around the attachment seat of the storage portion in a state where the folded body is fixed to the storage portion so as to form a recess portion recessed from an outer circumferential surface of the folded body; and
   the lower-most horizontal surface of the stepped surface of the folded body of the airbag is separated from a base plate portion of the storage portion so as to form a gap, the base plate portion including the attachment seat, wherein
   the vertical surface of the stepped surface is bent upward from the bottom wall cover portion in a state where the vertical surface is in direct contact with an outer circumferential surface of the reinforcing rib of the retainer.

2. The airbag assembly according to claim 1, wherein the stepped surface is arranged in an entire area of the bottom wall separated portion of the folded body.

3. The airbag assembly according to claim 1, wherein the lower-most horizontal surface of the stepped surface is disposed above the annular bottom wall portion of the retainer.

4. The airbag assembly according to claim 1, wherein the lower-most horizontal surface of the stepped surface is disposed to be positioned at a height equal to or higher than an upper end surface of the reinforcing rib of the retainer.

5. The airbag assembly according to claim 1, wherein the base plate portion includes the attachment seat and is substantially planar.

* * * * *